(12) United States Patent
Varanda

(10) Patent No.: US 11,561,885 B2
(45) Date of Patent: Jan. 24, 2023

(54) AUTOMATED END-TO-END TESTING PLATFORM WITH DYNAMIC CONTAINER CONFIGURATION

(71) Applicant: Bank of America Corporation, Charlotte, NC (US)

(72) Inventor: Ricardo Jorge Pimental Varanda, Reading (GB)

(73) Assignee: Bank of America Corporation, Charlotte, NC (US)

( * ) Notice: Subject to any disclaimer, the term of this patent is extended or adjusted under 35 U.S.C. 154(b) by 143 days.

(21) Appl. No.: 17/171,113

(22) Filed: Feb. 9, 2021

(65) Prior Publication Data

US 2022/0253374 A1 Aug. 11, 2022

(51) Int. Cl.
| | |
|---|---|
| *G06F 11/00* | (2006.01) |
| *G06F 11/36* | (2006.01) |
| *G06F 3/0482* | (2013.01) |

(52) U.S. Cl.
CPC ...... *G06F 11/3664* (2013.01); *G06F 11/3684* (2013.01); *G06F 11/3688* (2013.01); *G06F 11/3692* (2013.01); *G06F 3/0482* (2013.01)

(58) Field of Classification Search
CPC ............ G06F 11/3664; G06F 11/3684; G06F 11/3688; G06F 11/3692
See application file for complete search history.

(56) References Cited

U.S. PATENT DOCUMENTS

| | | | |
|---|---|---|---|
| 1,064,496 A | 10/1913 | Lagergren | |
| 7,451,163 B2 | 11/2008 | Selman et al. | |
| 7,827,565 B2 | 11/2010 | Minium, Jr. et al. | |
| 8,533,676 B2 | 9/2013 | Watter et al. | |
| 8,745,585 B2 | 6/2014 | Watters et al. | |
| 9,053,238 B2 | 6/2015 | Krishnan et al. | |
| 9,058,430 B2 | 6/2015 | Pal et al. | |
| 9,092,578 B2 | 7/2015 | Wefers | |
| 9,116,779 B2 | 8/2015 | McClamroch et al. | |
| 9,164,759 B2 | 10/2015 | McClamroch et al. | |
| 9,459,839 B2 | 10/2016 | Kisynski et al. | |
| 10,430,322 B2 | 10/2019 | Marco et al. | |
| 10,671,520 B1* | 6/2020 | Rodrigues | H04L 41/0806 |
| 2014/0282434 A1* | 9/2014 | Eilam | G06F 11/3688 717/124 |
| 2014/0380278 A1* | 12/2014 | Dayan | G06F 11/3688 717/124 |

(Continued)

*Primary Examiner* — Joshua P Lottich
(74) *Attorney, Agent, or Firm* — Banner & Witcoff, Ltd.

(57) ABSTRACT

Aspects of the disclosure relate to an automated end-to-end testing platform. A computing platform comprising at least one processor, a communication interface, and memory storing computer-readable instructions may receive first test configuration data for a first test and second test configuration data for a second test. The computing platform may generate a first container based on the first test configuration data and may run the first container to generate a first set of test results. The computing platform may determine that a subset of the first set of test results is to be used during an execution of the second test. The computing platform may generate a second container based on the second test configuration data and the subset of the first set of test results. The computing platform may run the second container to generate a second set of test results.

20 Claims, 22 Drawing Sheets

(56) References Cited

U.S. PATENT DOCUMENTS

2014/0380281 A1* 12/2014 McLaughlin ....... G06F 11/3688
  717/127
2017/0046251 A1*  2/2017 Jafary ................. G06F 11/3692
2020/0380522 A1* 12/2020 Perkal ..................... G06F 9/547
2022/0237107 A1*  7/2022 Subbunarayanan ........................
  G06F 11/3684

* cited by examiner

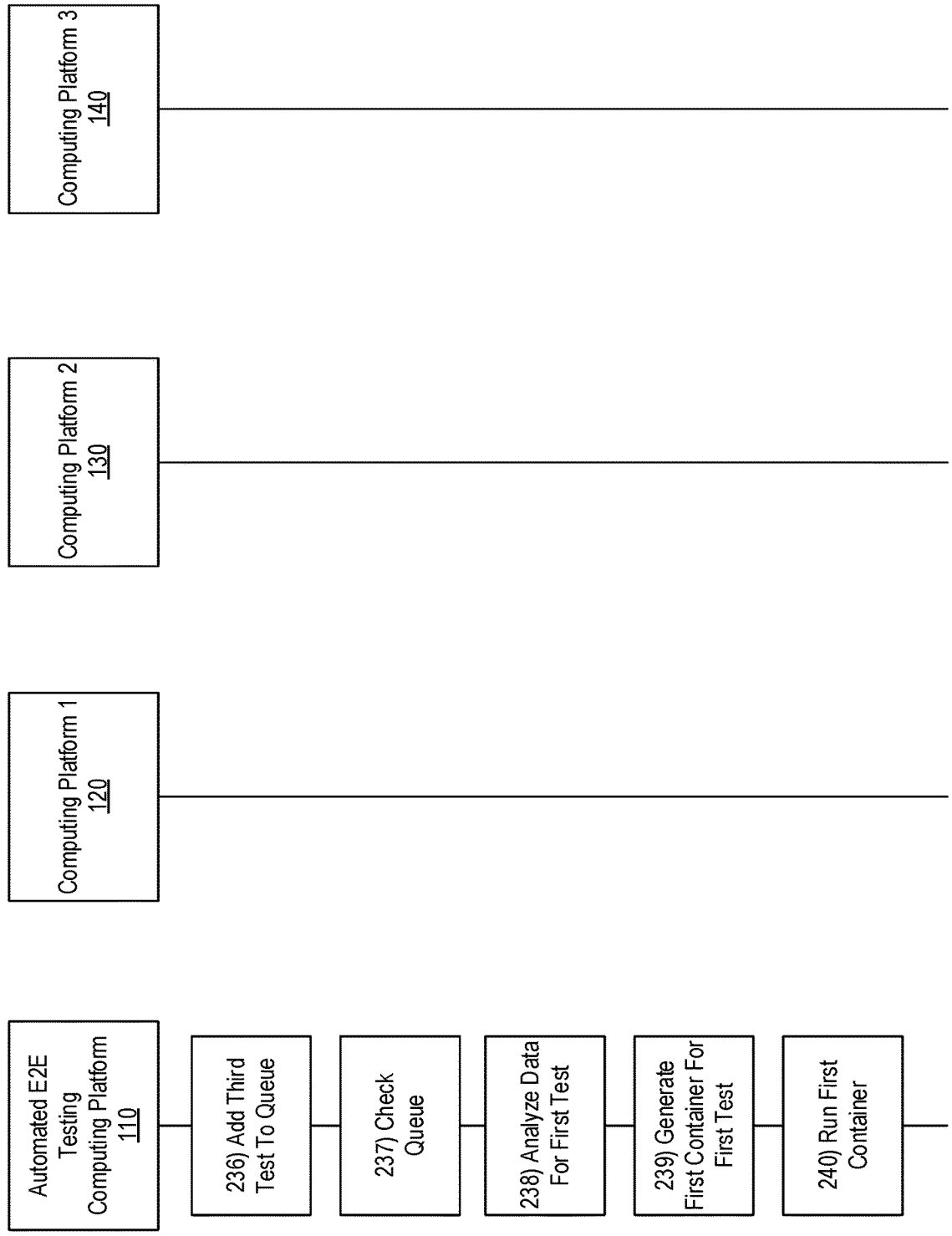

315

Front End Testing Configuration Interface

| | Browser 1 | Browser 2 | Browser 3 |
|---|---|---|---|
| Select Browser: | ☐ | ☐ | ☐ |

Front End Testing Configuration Interface

| | Version 1 | Version 2 | Version 3 |
|---|---|---|---|
| Select Browser Version for Browser 1: | ☐ | ☐ | ☐ |
| Select Browser Version for Browser 2: | ☐ | ☐ | |
| Select Browser Version for Browser 3: | ☐ | ☐ | |

Upload Testing Files

Testing File 1

Testing File 2

•
•
•

Testing File N

Complete Configuration

Upload Testing Data for Predefined Test 1

Testing Data 1

Testing Data 2

•
•
•

Testing Data N

Complete Configuration

FIG. 3H

AUTOMATED END-TO-END TESTING PLATFORM WITH DYNAMIC CONTAINER CONFIGURATION

BACKGROUND

Aspects of the disclosure relate to an automated end-to-end testing platform. In particular, one or more aspects of the disclosure relate to creating testing containers based on testing requirements and re-using test results during test execution.

In some cases, enterprise organizations may comprise hundreds or thousands of teams, units, or entities that individually conduct software testing. This results in different testing frameworks, testing standards, and testing reports across the organization, some of which may conflict. This also leads to inefficiencies in testing, as the different teams may all be testing shared systems separately and repeatedly, which in turn may strain the system resources and may lead to unnecessary processor and network usage.

SUMMARY

Aspects of the disclosure provide effective, efficient, scalable, and convenient technical solutions that address and overcome the technical problems associated with conventional testing systems. In accordance with one or more embodiments of the disclosure, a computing platform comprising at least one processor, a communication interface, and memory storing computer-readable instructions may receive, from a first computing platform, first test configuration data for a first test. The computing platform may receive, from a second computing platform, second test configuration data for a second test. The computing platform may determine that the first test is to be executed. The computing platform may, in response to determining that the first test is to be executed, generate a first container based on the first test configuration data. The computing platform may run the first container to generate a first set of test results. The computing platform may generate a first test report based on the first set of test results. The computing platform may send the first test report to the first computing platform, wherein the sending the first test report to the first computing platform causes the first computing platform to display the first set of test results. The computing platform may analyze the first test configuration data and the second test configuration data. The computing platform may, based on analyzing the first test configuration data and the second test configuration data, determine that a subset of the first set of test results is to be used during an execution of the second test.

The computing platform may determine that the second test is to be executed. The computing platform may, in response to determining that the second test is to be executed, and based on determining that the subset of the first set of test results is to be used during the execution of the second test, generate a second container based on the second test configuration data and the subset of the first set of test results. The computing platform may run the second container to generate a second set of test results. The computing platform may generate a second test report based on the second set of test results. The computing platform may send the second test report to the second computing platform, wherein the sending the first test report to the second computing platform causes the second computing platform to display the second set of test results.

In one or more instances, the computing platform may receive the first test configuration data for the first test from the first computing platform in response to the computer platform sending a first graphical user interface to the first computing platform, wherein the sending the first graphical user interface to the first computing platform causes the first computing platform to display the first graphical user interface. In one or more instances, the first graphical user interface may comprise a plurality of selectable triggers for the first test. In one or more instances, the first test configuration data may comprise a first trigger of the plurality of selectable triggers. In one or more instances, the computing platform may determine that the first test is to be executed based on the first trigger.

In one or more instances, the first graphical user interface may comprise a plurality of selectable triggers for the first test. In one or more instances, the first test configuration data may comprise a user selection identifying a first browser of the plurality of selectable browsers. In one or more instances, the first container may comprise the first browser based on the first test configuration data comprising the user selection identifying the first browser.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3A-3H depict illustrative graphical user interfaces that implement an automated end-to-end testing computing platform in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to automated end-to-end testing computing platform. To improve the efficiency of conventional testing systems, an enterprise may implement a centralized testing system that enables data-sharing between different tests.

In such a centralized testing system, a universal testing tool may be provided by an enterprise. The testing tool may be accessible by different teams across an enterprise. The teams may configure and execute any number of tools via the testing tool. The testing tool may be configured to determine whether any data can be reused between any of the different tests executed by the different teams. Such data reuse may minimize the loads on the enterprise processors and networks. The testing tool may dynamically generate testing containers based on its analysis of potential data reuse between tests.

Figure 1A:
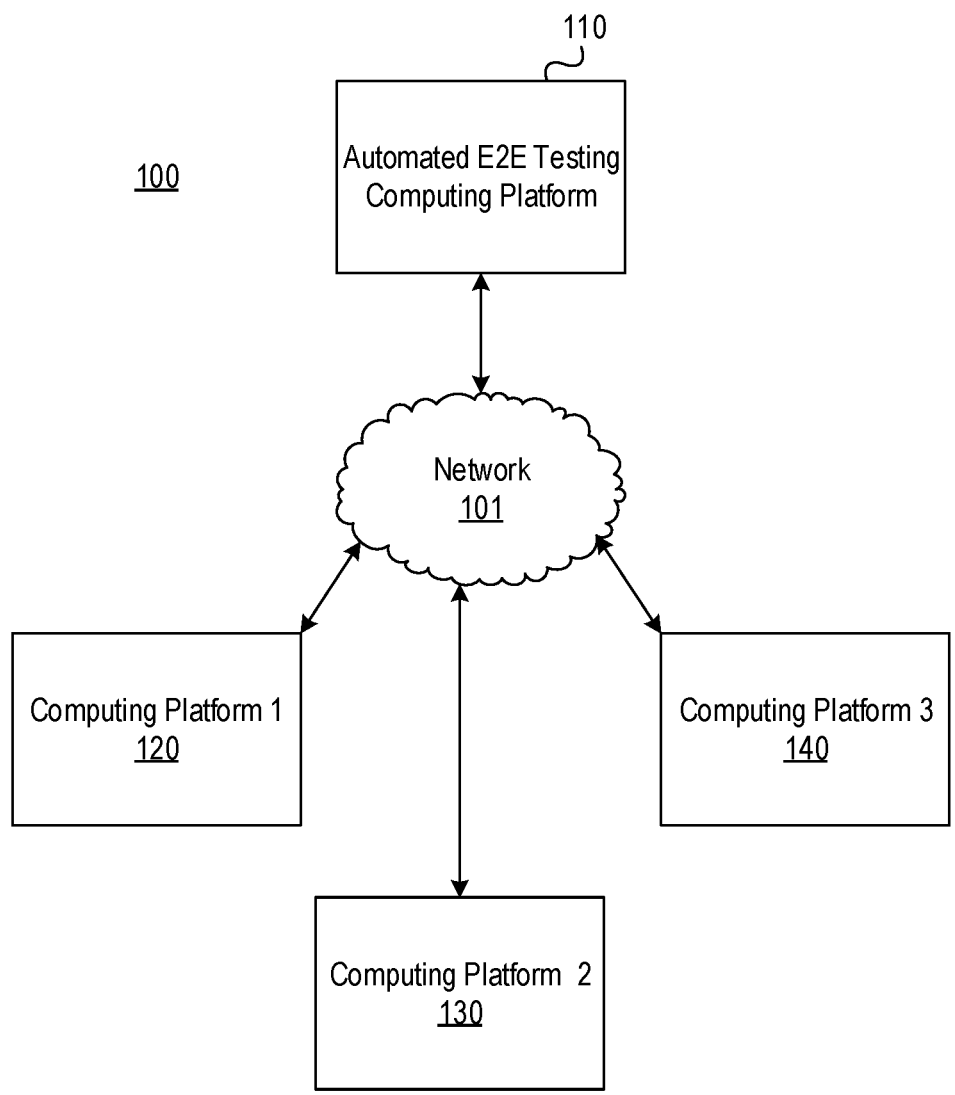
FIGS. 1A-1B depict an illustrative computing environment for implementing an automated end-to-end testing computing platform in accordance with one or more example embodiments.
Figure 1B:
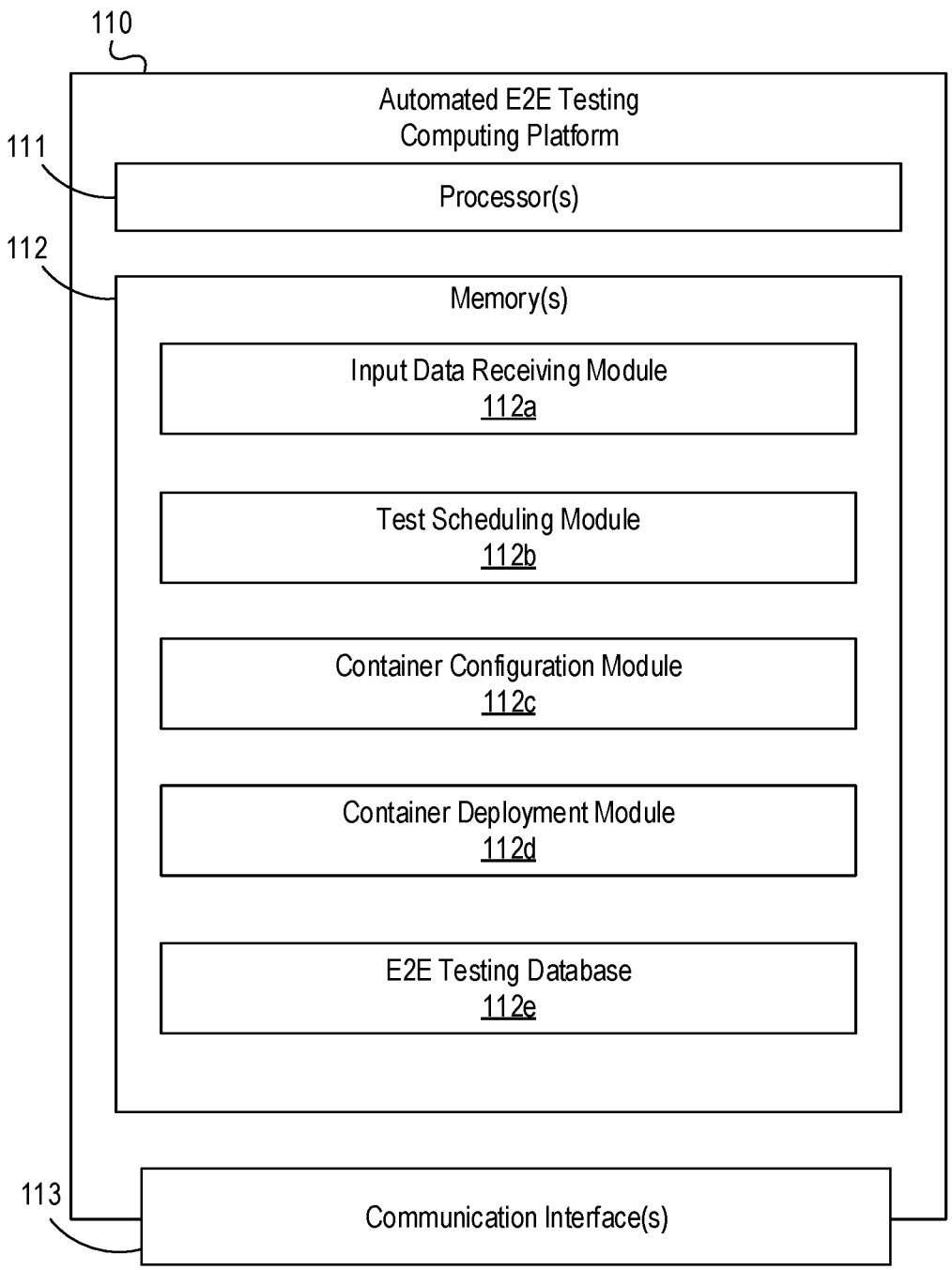

FIGS. 1A-1B depict an illustrative computing environment that implements an automated end-to-end testing computing platform in accordance with one or more example embodiments. Referring to FIG. 1A, computing environment 100 may include one or more computer systems. For example, computing environment 100 may include an automated end-to-end testing computing platform 110, computing platform 120, computing platform 130, and computing platform 140.

As described further below, automated end-to-end testing computing platform 110 may be a computer system that includes one or more computing devices (e.g., servers, server blades, or the like) and/or other computer components (e.g., processors, memories, communication interfaces) that may be used to generate and conduct one or more tests. In some instances, automated end-to-end testing computing platform 110 may be controlled or otherwise maintained by an enterprise organization such as a financial institution.

Computing platform 120 may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or event processing. In one or more instances, computing platform 120 may be configured to communicate with automated end-to-end testing computing platform 110 for test configuration and execution. Computing platform 130 and computing platform 140 may be computing platforms similar to computing platform 120.

Computing environment 100 also may include one or more networks, which may interconnect automated end-to-end testing computing platform 110, computing platform 120, computing platform 130, and computing platform 140. For example, computing environment 100 may include a network 101 (which may interconnect, e.g., automated end-to-end testing computing platform 110, computing platform 120, computing platform 130, and computing platform 140).

In one or more arrangements, automated end-to-end testing computing platform 110, computing platform 120, computing platform 130, and computing platform 140 may be any type of computing device capable of sending and/or receiving requests and processing the requests accordingly. For example, automated end-to-end testing computing platform 110, computing platform 120, computing platform 130, and computing platform 140, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of automated end-to-end testing computing platform 110, computing platform 120, computing platform 130, and computing platform 140, may, in some instances, be special-purpose computing devices configured to perform specific functions.

Referring to FIG. 1B, automated end-to-end testing computing platform 110 may include one or more processors 111, memory 112, and communication interface 113. A data bus may interconnect processor 111, memory 112, and communication interface 113. Communication interface 113 may be a network interface configured to support communication between automated end-to-end testing computing platform 110 and one or more networks (e.g., network 101, or the like). Memory 112 may include one or more program modules having instructions that when executed by processor 111 cause automated end-to-end testing computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of automated end-to-end testing computing platform 110 and/or by different computing devices that may form and/or otherwise make up automated end-to-end testing computing platform 110. For example, memory 112 may have, host, store, and/or include input data receiving module 112a, test scheduling module 112b, container configuration module 112c, container deployment module 112d, and end-to-end testing database 112e.

Input data receiving module 112a may have instructions that direct and/or cause automated end-to-end testing computing platform 110 to receive input data from any of the computing platforms shown in FIG. 1A (i.e., computing platform 120, computing platform 130, and computing platform 140). Test scheduling module 112b may maintain a test queue utilized by automated end-to-end testing computing platform. Container configuration module 112c may generate containers for the tests to be executed by automated end-to-end testing computing platform 110. Container deployment module 112d may maintain a processor workload optimization model utilized by automated end-to-end testing computing platform 110 to determine which particular processor 111 is to execute any given test. End-to-end testing database 112e may be utilized by automated end-to-end testing computing platform 110 to store any test-related data, such as test configuration data, test results, containers, test queue(s), and the processor workload optimization model.

Figure 2A:
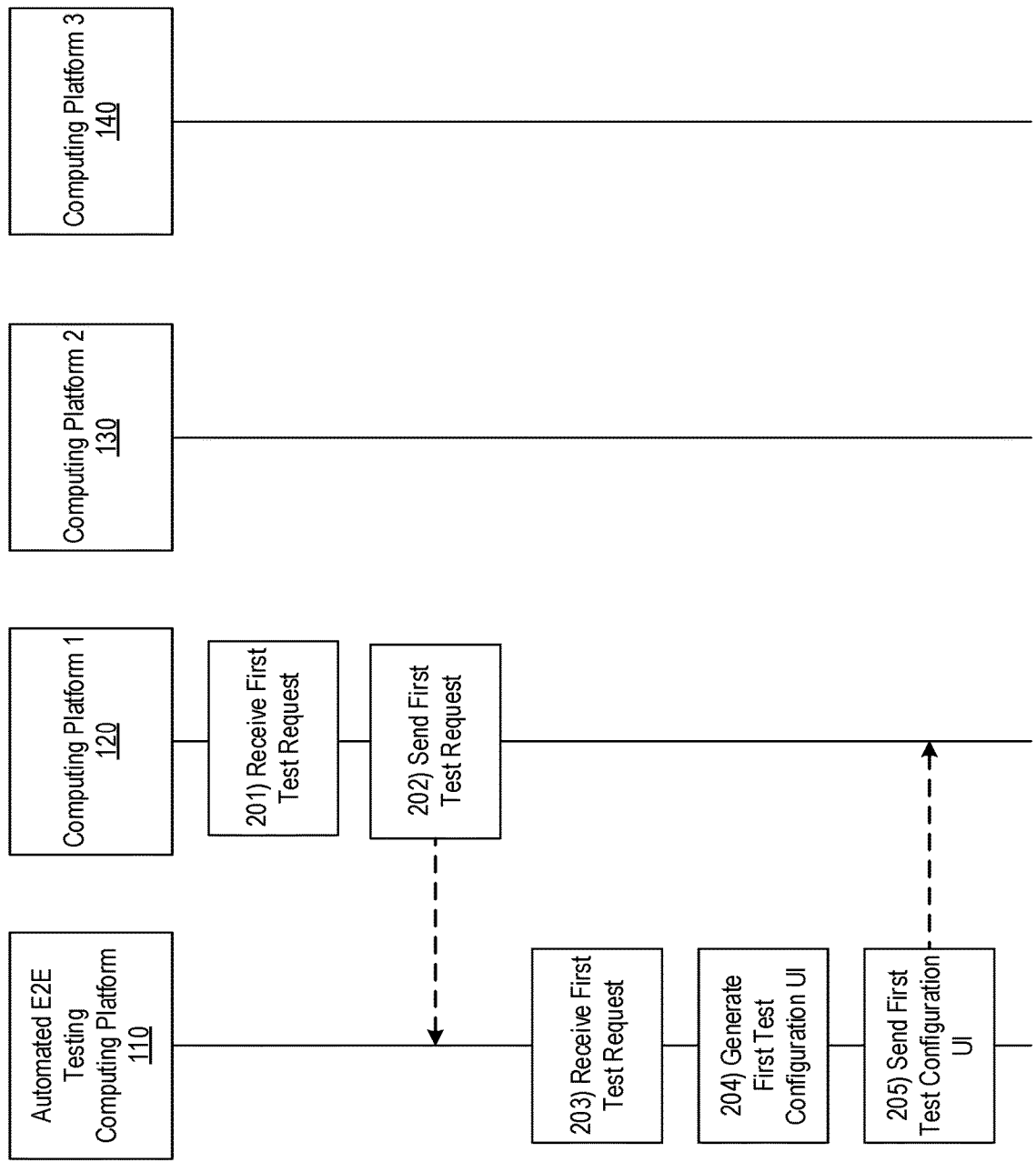
FIGS. 2A-2N depict an illustrative event sequence for implementing an automated end-to-end testing computing platform in accordance with one or more example embodiments.
Figure 2B:
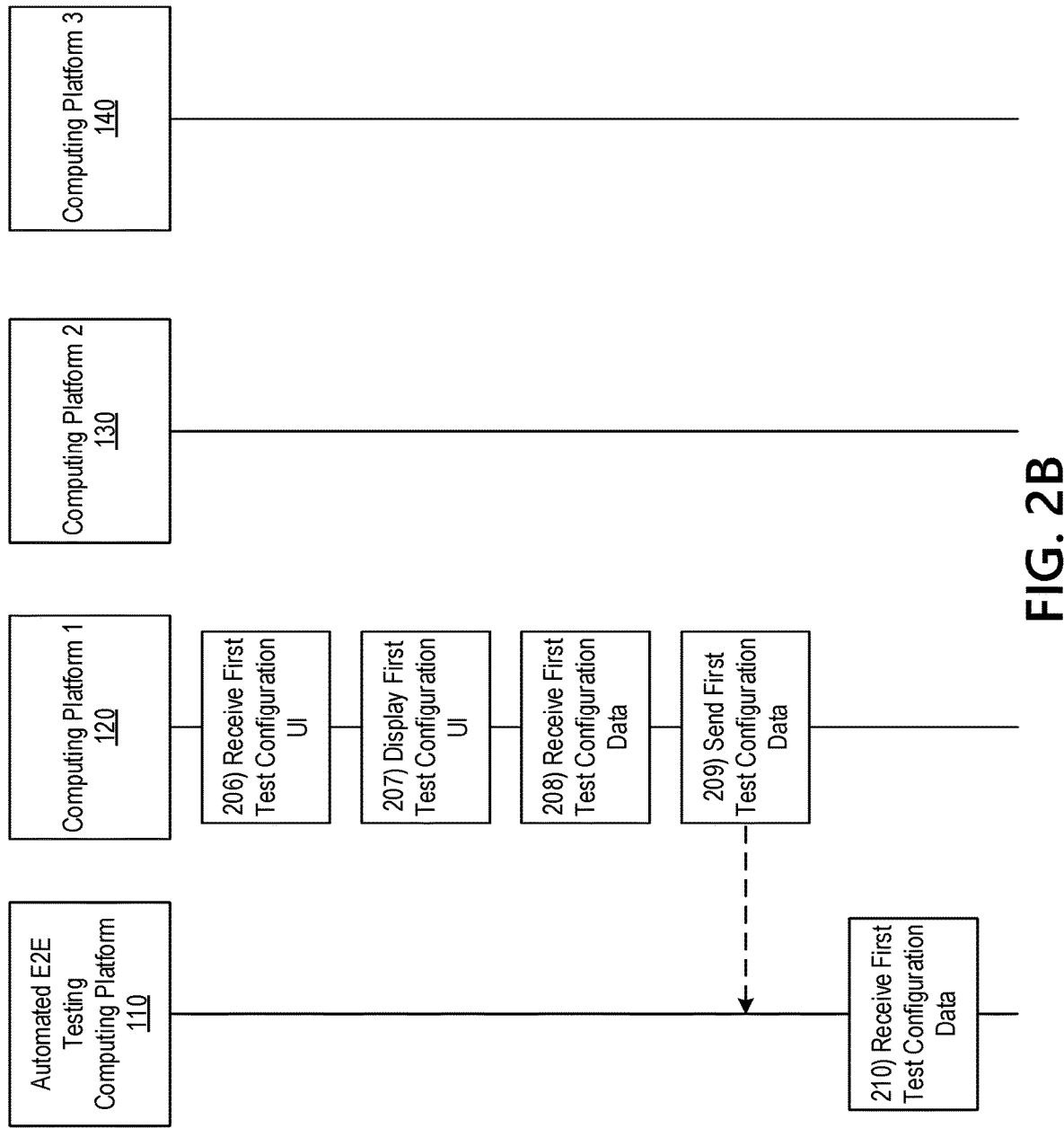
Figure 2C:
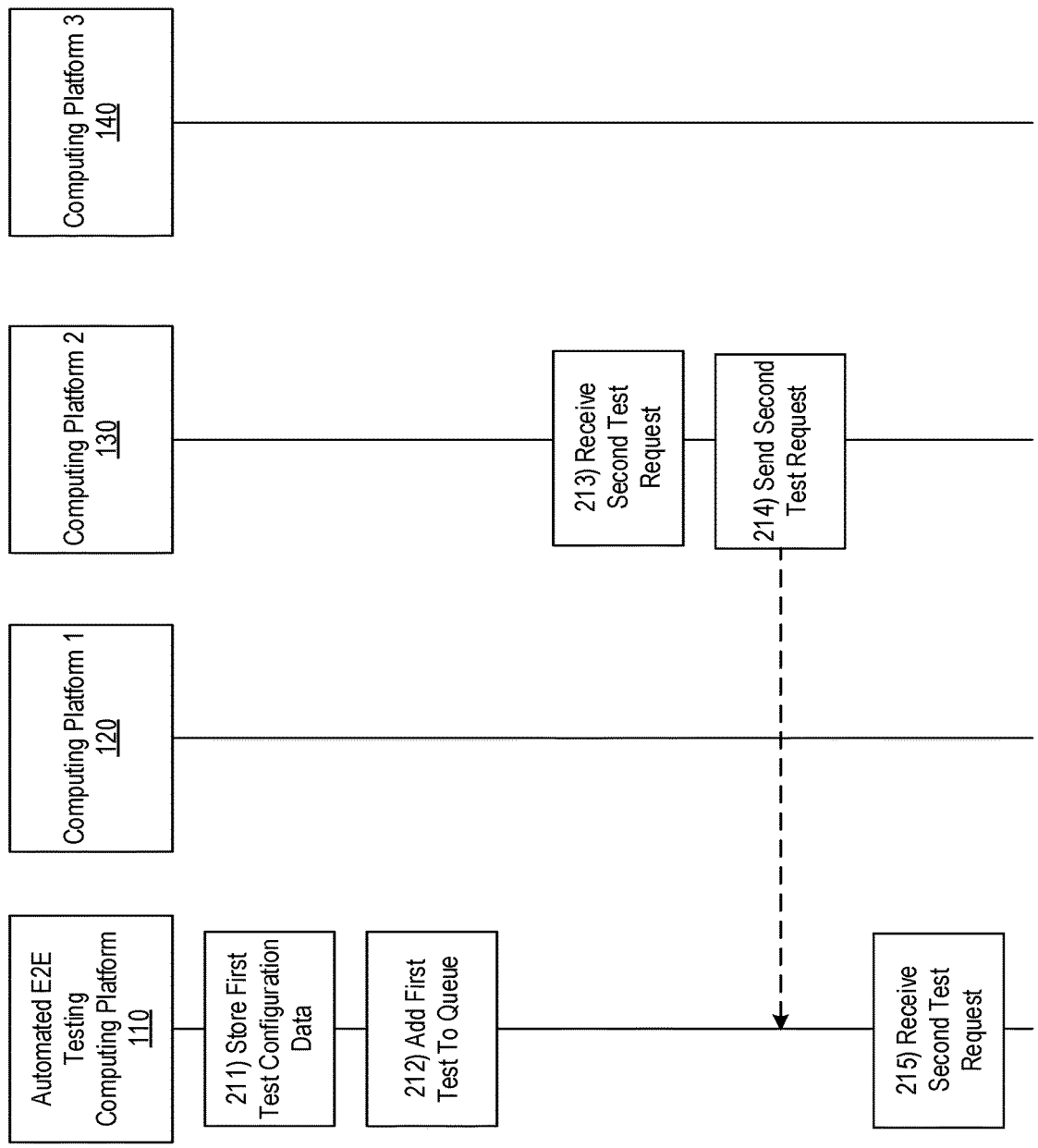
Figure 2D:
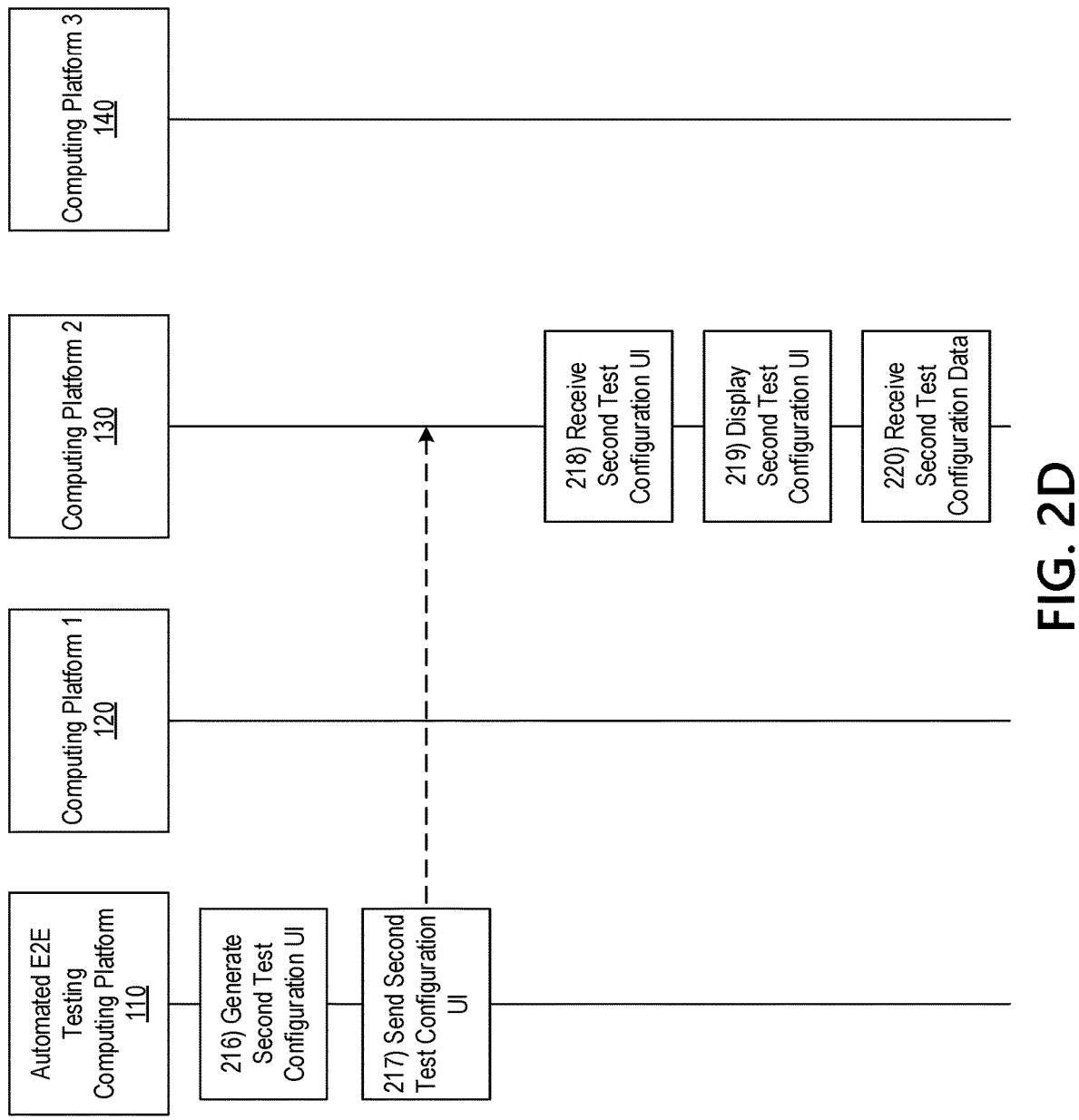
Figure 2E:
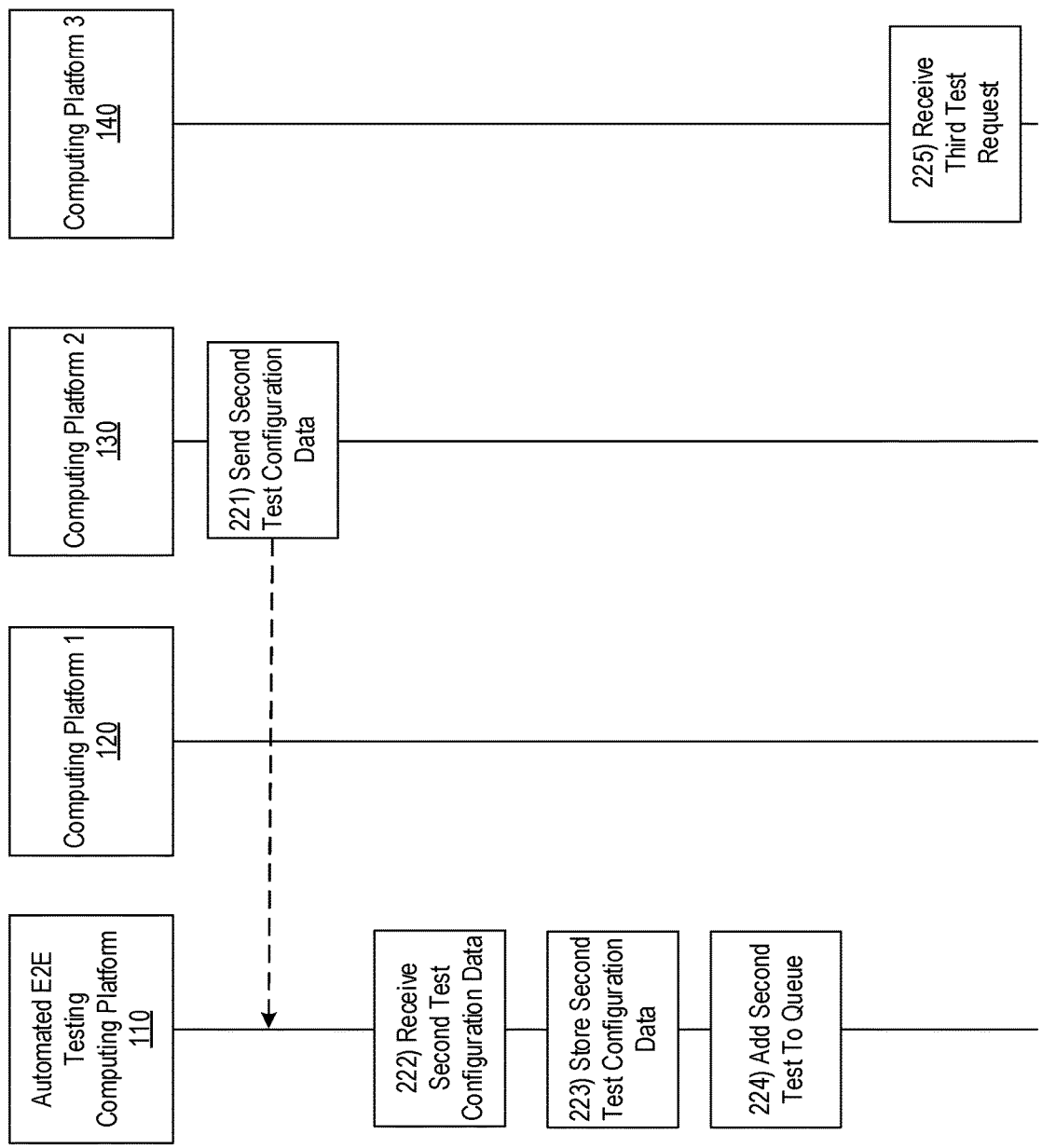
Figure 2F:
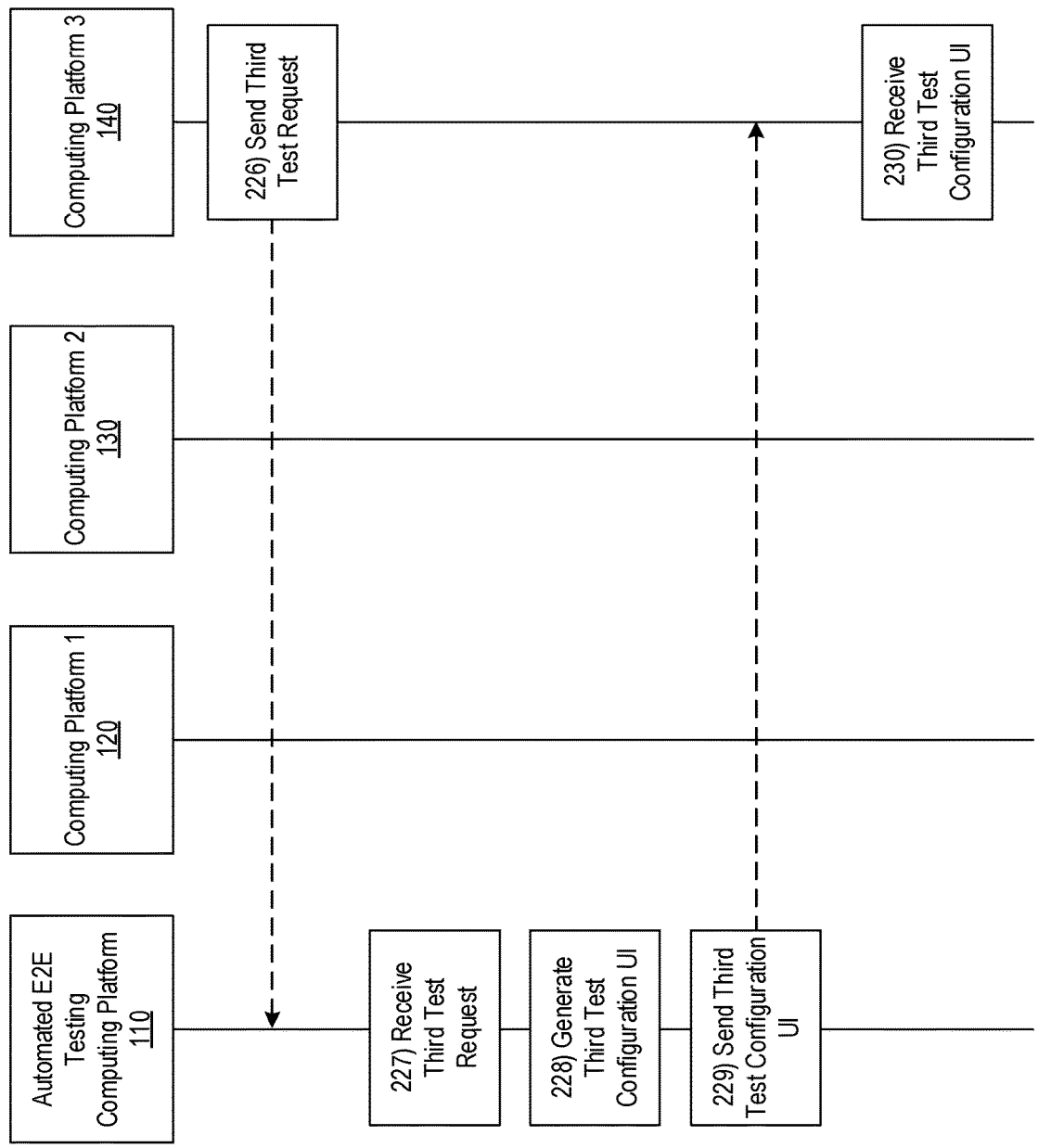
Figure 2G:
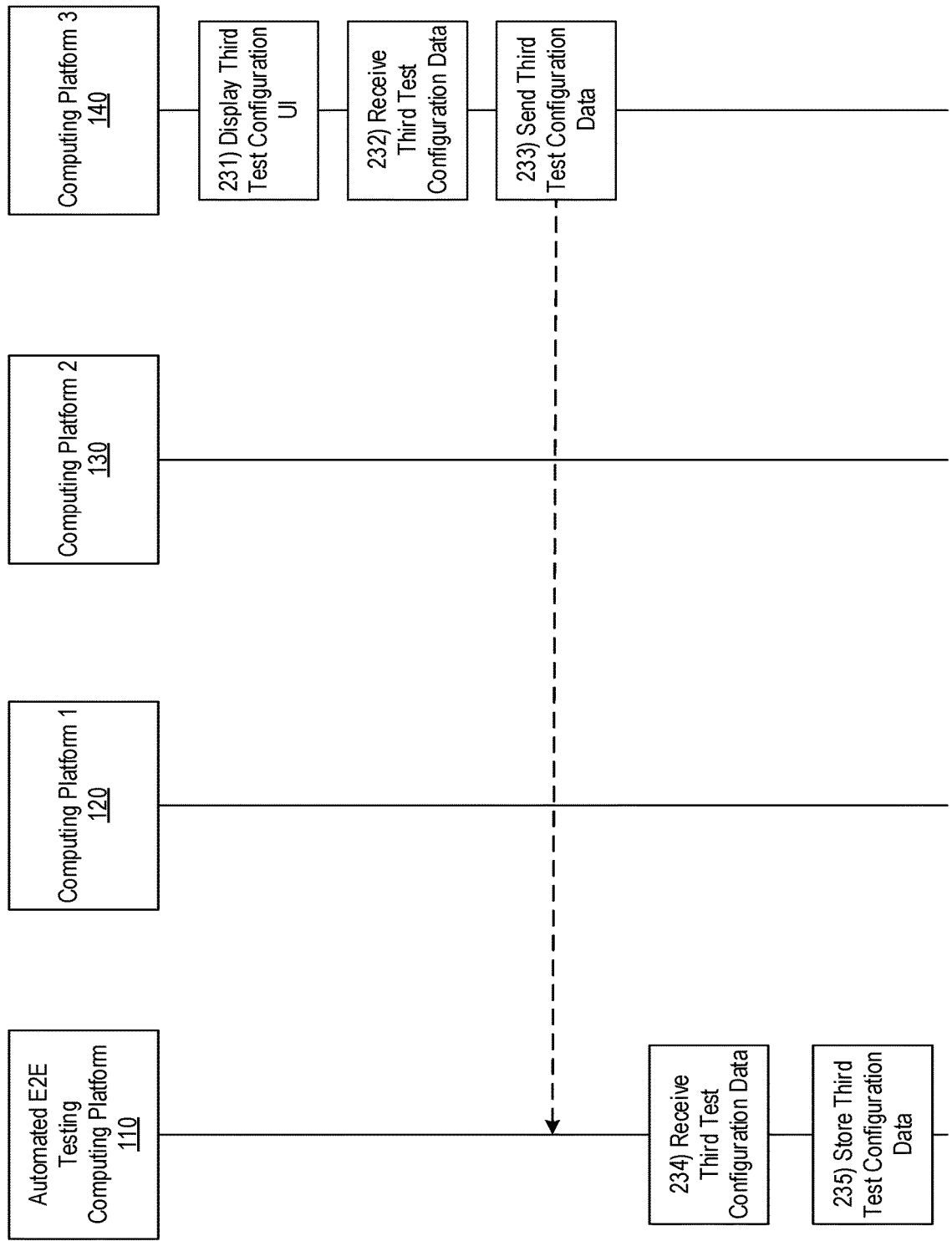
Figure 2I:
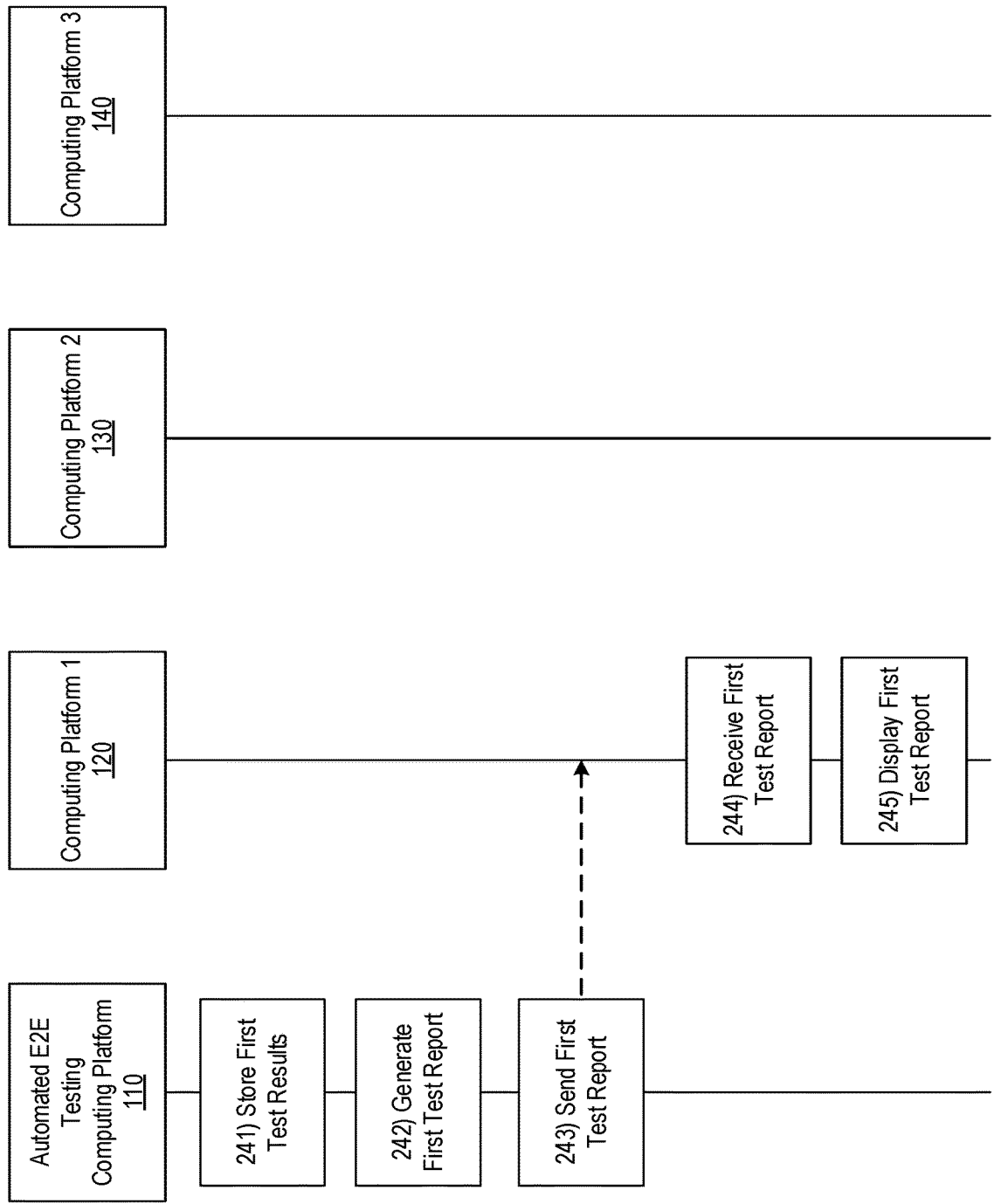
Figure 2J:
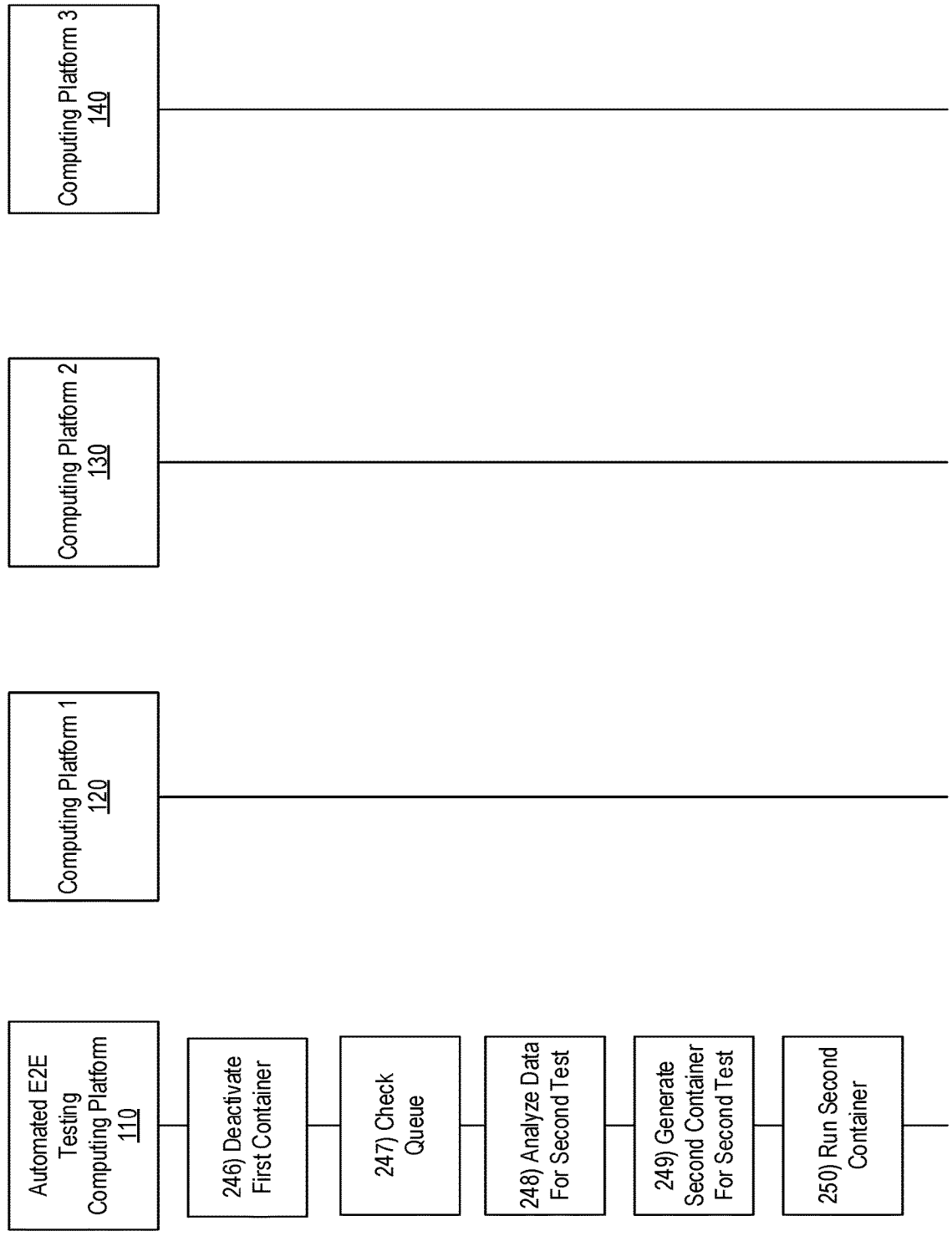
Figure 2K:
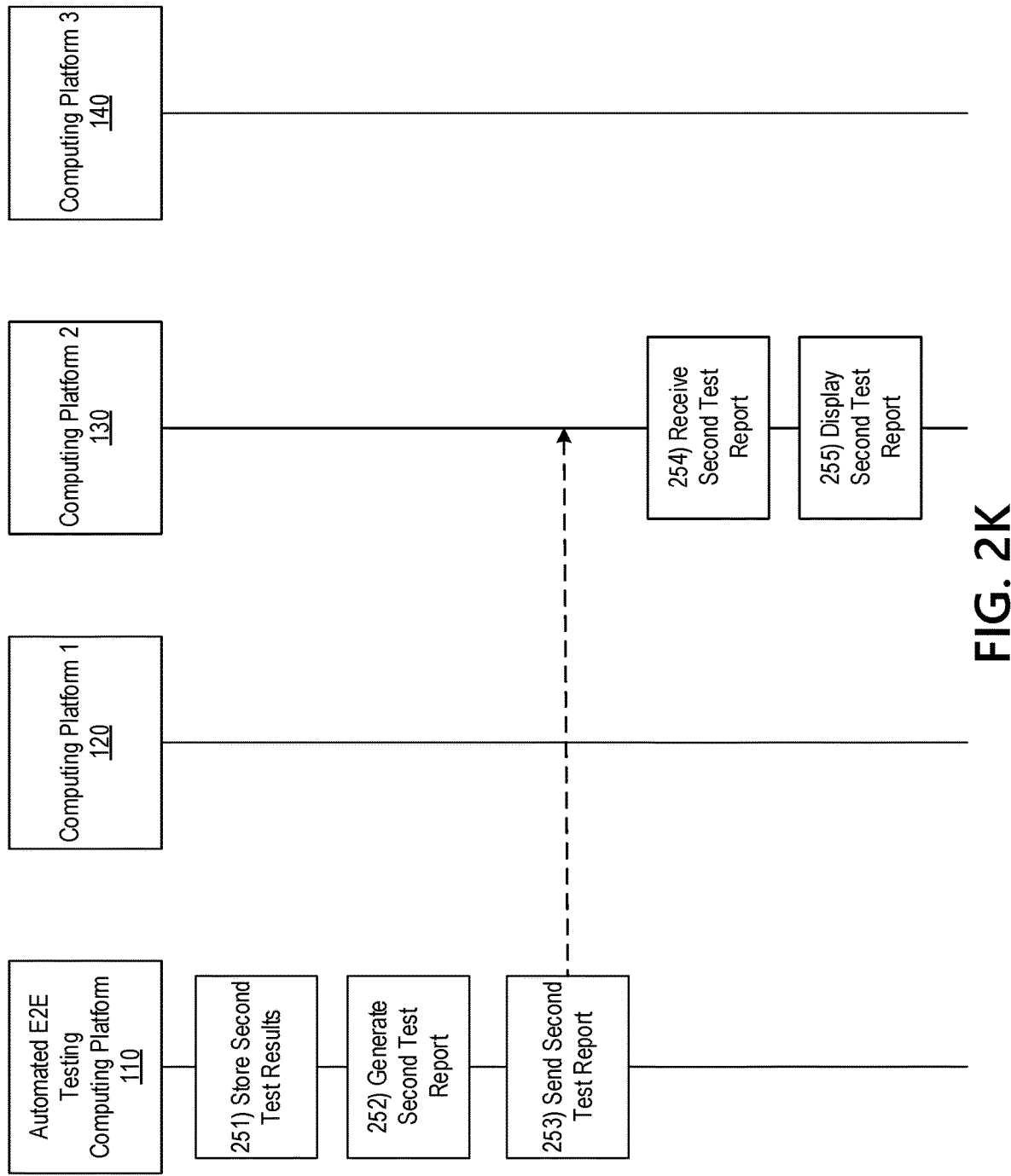
Figure 2L:
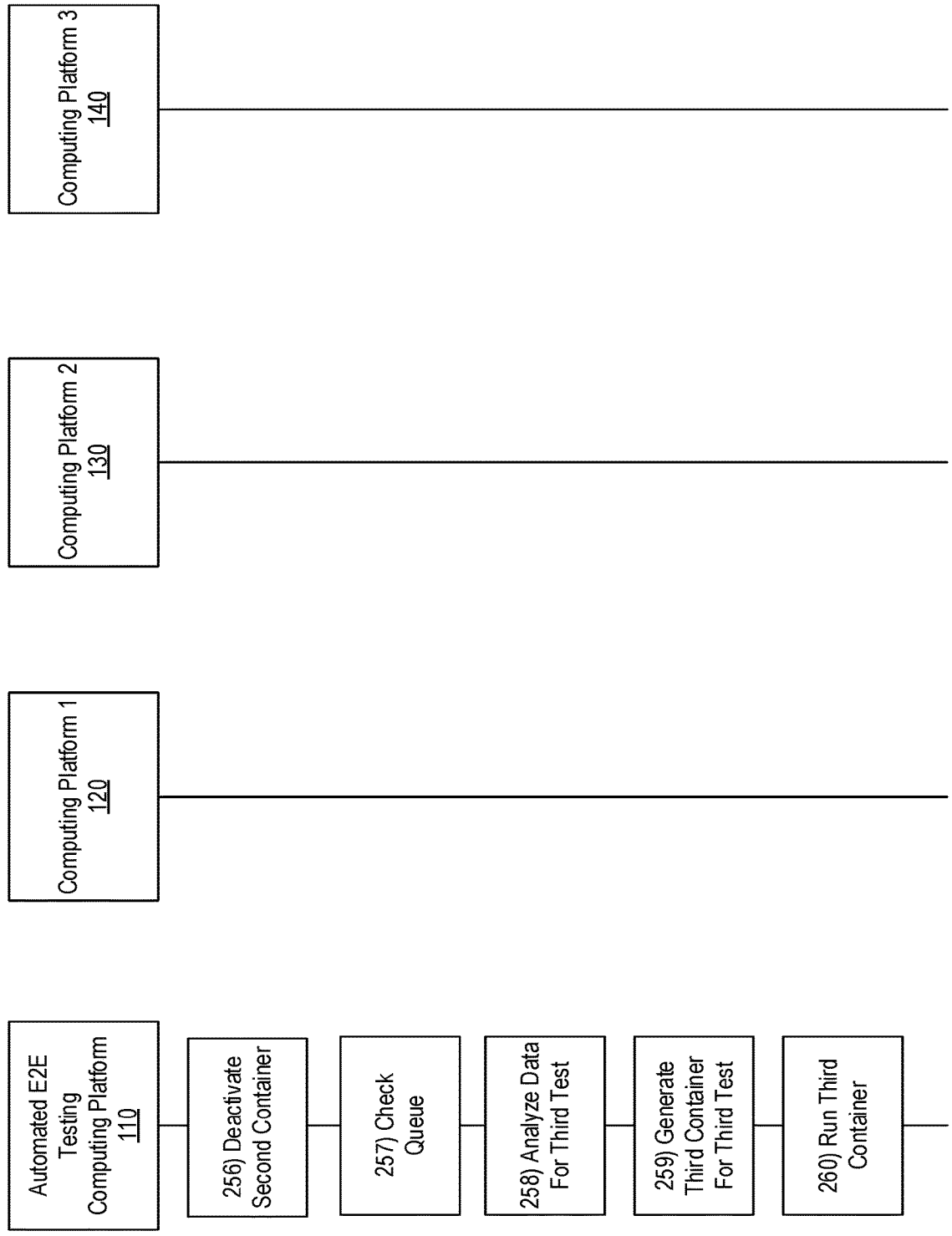
Figure 2M:
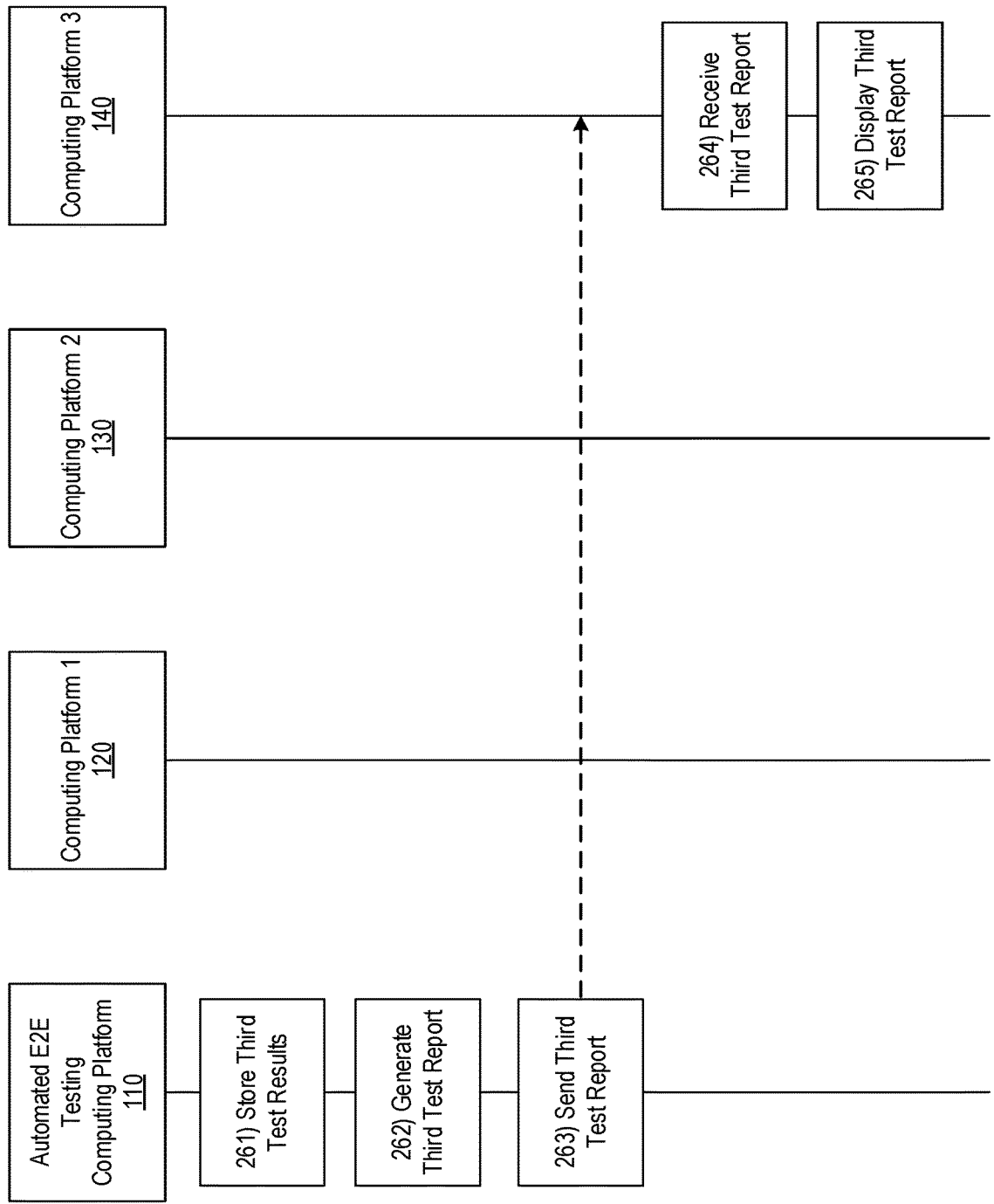
Figure 2N:
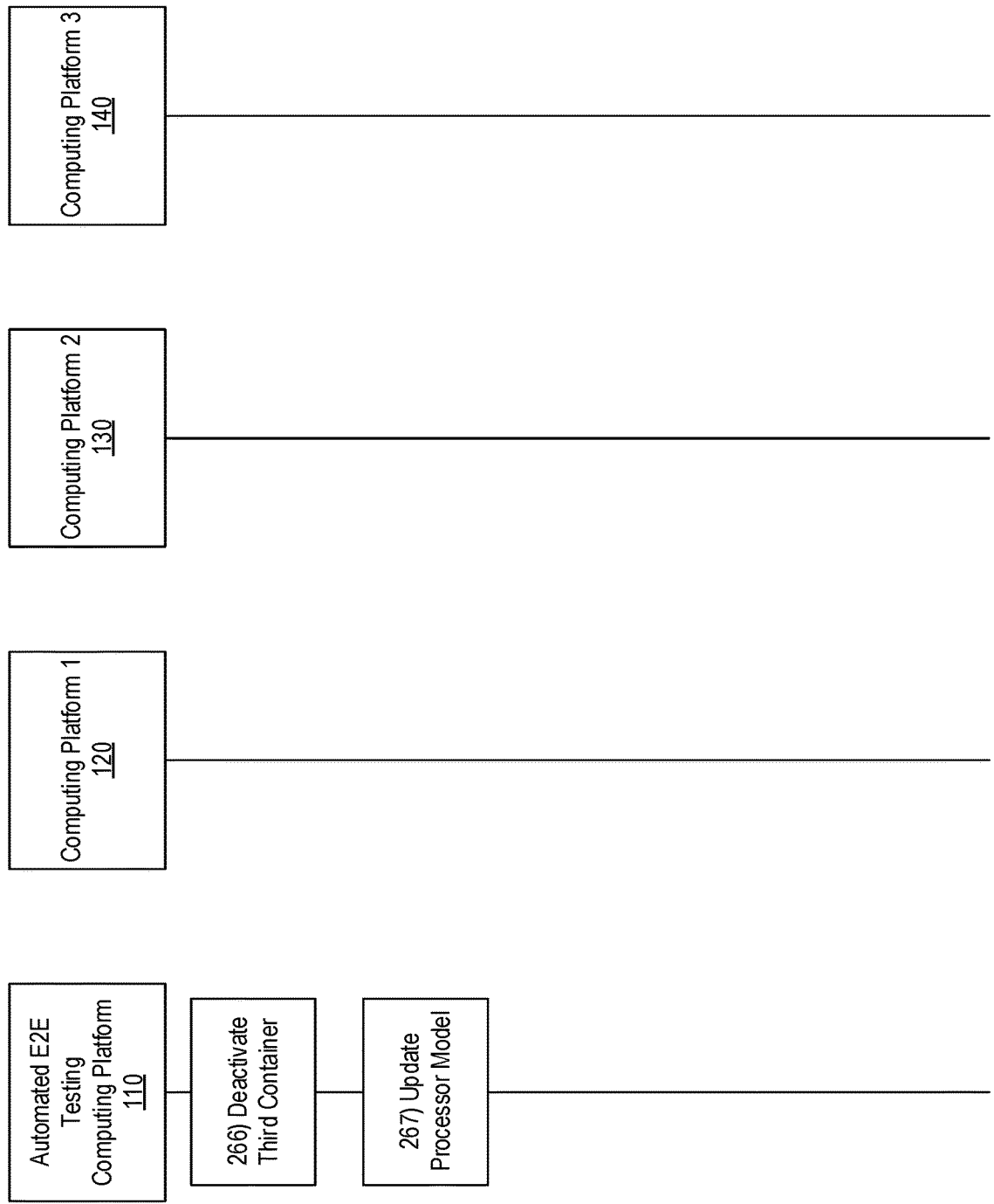

FIGS. 2A-2N depict an illustrative event sequence for implementing an automated end-to-end testing computing platform 110 in accordance with one or more example embodiments. Referring to FIG. 2A, at step 201, computing platform 120 may receive a first test request. The first test request may be received by computing platform 120 via a graphical user interface displayed by computing platform 120, via an application executing on computing platform 120, via a message received by computing platform 120, or the like. The first test request may indicate that a user wants to run a test (for example, test an application, test an application programming interface, test a website, or the like) via computing platform 120. At step 202, in response to receiving the first test request, computing platform 120 may send the first test request to automated end-to-end testing computing platform 110. Prior to sending the first test request, computing platform 120 may supplement the first test request to include additional data. In one example, the supplemented data may comprise data identifying computing platform 120 as the computing platform at which the first test request was received. Alternatively, computing platform 120 may send additional data to automated end-to-end testing computing platform 110 (such as data identifying computing platform 120 as the computing platform at which the first test request was received) separately from the first test request.

At step 203, automated end-to-end testing computing platform 110 may receive the first test request sent by computing platform 120. Automated end-to-end testing computing platform 110 may parse and analyze the first test request. At step 204, automated end-to-end testing computing platform 110 may generate a first test configuration graphical user interface based on its analysis at step 203. The first test configuration graphical user interface may comprise one or more graphical user interfaces to be displayed by computing platform 120 to obtain test configuration data from the user for the first test. The test configuration data may include the testing framework for the first test (for example, end-to-end testing, front end testing, back end testing), which test is to be run (for example, whether the first test is a predefined test provided by automated end-to-end testing computing platform 110 or a custom test provided by the user of computing platform 120), and other test configuration parameters for the first test (for example, which browser the first test is to be run in, which version of the browser the first test may be using, a trigger for execution of the first test, a screen resolution for the first test, and/or the like). The contents of the first test configuration graphical user interface are discussed in further detail below in reference to FIGS. 3A-3H.

At step 205, automated end-to-end testing computing platform 110 may send the first test configuration graphical user interface generated by automated end-to-end testing computing platform 110 at step 204 to computing platform 120. Automated end-to-end testing computing platform 110 may identify computing platform 120 as the intended recipient of the first test configuration graphical user interface based on the data in the first test request received by automated end-to-end testing computing platform 110 from computing platform 120 at step 203. The first test configuration graphical user interface sent by automated end-to-end testing computing platform 110 to computing platform 120 at step 205 may include all of the graphical user interfaces discussed above with reference to step 204 or a subset of those interfaces.

The sending of the first test configuration graphical user interface by automated end-to-end testing computing platform 110 to computing platform 120 at step 205 may cause computing platform 120 to display the first test configuration graphical user interface. Specifically, referring to FIG. 2B, at step 206, computing platform 120 may receive the first test configuration graphical user interface from automated end-to-end testing computing platform 110. In response to receiving the first test configuration graphical user interface from automated end-to-end testing computing platform 110, computing platform 120 may, at step 207, display the first test configuration graphical user interface on a display screen associated with computing platform 120. As noted above with reference to step 204, the first test configuration graphical user interface may comprise a series of interfaces. Computing platform 120 may display the individual graphical user interfaces simultaneously or separately. Any number of the individual graphical user interfaces may be displayed simultaneously or separately.

At step 208, computing platform 120 may receive a set of first test configuration data via the first test configuration graphical user interface output to the display screen of computing platform 120. The set of first test configuration data may include one or more test configuration parameters for the first test, such as the browser, the browser version, the screen resolution, the trigger, and/or the like. The set of first configuration data may also include test-specific data—for example, if the user selected a predefined test provided by automated end-to-end testing computing platform 110, the set of first configuration data may include data required to run the predefined test (for example, a URL to be tested). The set of first test configuration data may also include the location of one or more testing files and/or application files associated with the first test. For example, if the user of computing platform 120 is using automated end-to-end testing computing platform 110 to run a custom test of a software application, the set of first test configuration data may include the storage location of the custom test file(s) and/or the software application file(s). In another example, if the user of computing platform 120 is using automated end-to-end testing computing platform 110 to run a predefined test of a software application, the set of first test configuration data may include the storage location of the software application file(s).

At step 209, computing platform 120 may send the first test configuration data to automated end-to-end testing computing platform 110. The first test configuration data may include any test configuration parameters and any test-specific data received by computing platform 120 via the first test configuration graphical user interface. The first test configuration data may also include the storage location(s) of one or more testing files and/or application files associated with first test. Alternatively, the first test configuration data may include the testing files and/or the application files. Computing platform 120 may determine whether to send the storage locations of the application/testing files based on the size of the files. In one example, a threshold size may be dynamically determined by computing platform 120 (or automated end-to-end testing computing platform 110) based on a current network bandwidth usage of network 110. In another example, the threshold size may be predetermined by automated end-to-end testing computing platform 110 or computing platform 120. If the size of the application/testing files exceeds the threshold size, computing platform 120 may send the storage location of the application/testing files to automated end-to-end testing computing platform 110; if the size of the application/testing files is below the threshold size, computing platform 120 may send the application/testing files to automated end-to-end testing computing platform 110 (or vice versa).

At step 210, automated end-to-end testing computing platform 110 may receive the first test configuration data sent by computing platform 120 at step 209. Referring to FIG. 2C, at step 211, automated end-to-end testing computing platform 110 may store the first test configuration data. Automated end-to-end testing computing platform 110 may store the first test configuration data locally (for example, in end-to-end testing database 112*f*). Alternatively, automated end-to-end testing computing platform 110 may utilize remote storage (not shown), such as a remote server or a remote database accessible via network 110. Automated end-to-end testing computing platform 110 may determine, in real-time, the storage location for the first test configuration data. Such a determination may be based on a comparison of the size of the first test configuration data and a threshold data storage size. For example, if the size of the first test configuration data is below the threshold data storage size, automated end-to-end testing computing platform 110 may store the first test configuration data, but if the size of the first test configuration data exceeds the threshold data storage size, automated end-to-end testing computing platform 110 may send the first test configuration data to remote storage (or vice versa).

At step 212, automated end-to-end testing computing platform 110 may store first test data in a queue. The queue may be maintained by automated end-to-end testing computing platform 110, and may comprise upcoming tests to be executed by automated end-to-end testing computing platform 110. The first test data stored by automated end-to-end testing computing platform 110 in the queue may include some or all of the first test configuration data received by automated end-to-end testing computing platform 110 from computing platform 120 (for example, the trigger for the first test).

At step 213, computing platform 130 may receive a second test request. The second test request may be received by computing platform 130 via a graphical user interface displayed by computing platform 130, via an application executing on computing platform 130, via a message received by computing platform 130, or the like. The second test request may indicate that a user wants to run a software test (for example, test an application, test an application programming interface, test an website, or the like) via computing platform 130. At step 214, in response to receiving the second test request, computing platform 130 may send the second test request to automated end-to-end testing computing platform 110. Prior to sending the second test request, computing platform 130 may supplement the second test request to include additional data, such as data identifying computing platform 130 as the computing platform at which the second test request was received. Alternatively, computing platform 130 may send additional data to automated end-to-end testing computing platform 110 (such as data identifying computing platform 130 as the computing platform at which the second test request was received) separately from the second test request. At step 215, automated end-to-end testing computing platform 110 may receive the second test request sent by computing platform 130. Automated end-to-end testing computing platform 110 may parse and analyze the second test request.

Referring to FIG. 2D, at step 216, automated end-to-end testing computing platform 110 may generate a second test configuration graphical user interface based on its analysis at step 215. The second test configuration graphical user interface may include a plurality of graphical user interfaces to be displayed by computing platform 130 to obtain test configuration settings from the user for the second test. The configuration parameters may include the testing framework for the second test (for example, end-to-end testing, front end testing, back end testing), which test is to be run (for example, whether the second test is a predefined test provided by automated end-to-end testing computing platform 110 or a custom test provided by the user of computing platform 130), and one or more configuration parameters for the second test (for example, which browser the second test is to be run in, which version of the browser the second test may be using, a trigger for execution of the second test, a screen resolution for the second test, and/or the like). The contents of the second test configuration graphical user interface are discussed in further detail below in reference to FIGS. 3A-3H.

At step 217, automated end-to-end testing computing platform 110 may send the second test configuration graphical user interface generated by automated end-to-end testing computing platform 110 at step 216 to computing platform 130. Automated end-to-end testing computing platform 110 may identify computing platform 130 as the intended recipient of the second test configuration graphical user interface based on the data in the second test request received by automated end-to-end testing computing platform 110 from computing platform 130 at step 215. The second test configuration graphical user interface sent by automated end-to-end testing computing platform 110 to computing platform 130 at step 217 may include all or a subset of the graphical user interfaces discussed above with reference to step 216.

The sending of the second test configuration graphical user interface by automated end-to-end testing computing platform 110 to computing platform 130 at step 217 may cause computing platform 130 to display the second test configuration graphical user interface. Specifically, at step 218, computing platform 130 may receive the second test configuration graphical user interface from automated end-to-end testing computing platform 110. In response to receiving the second test configuration graphical user interface from automated end-to-end testing computing platform 110, computing platform 130 may, at step 219, display the second test configuration graphical user interface on a display screen associated with computing platform 130. As noted above with reference to step 216, the second test configuration graphical user interface may comprise a series of graphical user interfaces. Computing platform 130 may display the individual graphical user interfaces simultaneously or separately. Any number of the individual graphical user interfaces may be displayed simultaneously or separately.

At step 220, computing platform 130 may receive a set of second test configuration data via the second test configuration graphical user interface output to the display screen of computing platform 130. The set of second test configuration data may include one or more test configuration parameters for the second test, such as the browser, the browser version, the screen resolution, the trigger, and/or the like. The set of second configuration data may also include test-specific data—for example, if the user selected a predefined test provided by automated end-to-end testing computing platform 110, the set of second configuration data may include data required to run the predefined test (for example, a URL to be tested). The set of second test configuration data may also include the location of one or more testing files and/or application files associated with the second test. For example, if the user of computing platform 130 is using automated end-to-end testing computing platform 110 to run a custom test of a software application, the set of second test configuration data may include the storage location of the custom test file(s) and/or the software application file(s). In another example, if the user of computing platform 130 is using automated end-to-end testing computing platform 110 to run a predefined test of a software application, the set of second test configuration data may include the storage location of the software application file(s).

Referring to FIG. 2E, at step 221, computing platform 130 may send the second test configuration data to automated end-to-end testing computing platform 110. The second test configuration data may include any test configuration parameters and any test-specific data received by computing platform 130 via the second test configuration graphical user interface. The second test configuration data may also include the storage location(s) of one or more testing files and/or application files associated with second test. Alternatively, the second test configuration data may include the testing files and/or the application files. Computing platform 130 may determine whether to send the storage locations of the application/testing files based on the size of the files. In one example, a threshold size may be dynamically determined by computing platform 130 (or automated end-to-end testing computing platform 110) based on a current network bandwidth usage of network 110. In another example, the threshold size may be predetermined by automated end-to-end testing computing platform 110 or computing platform 130. If the size of the application/testing files exceeds the threshold size, computing platform 130 may send the storage location of the application/testing files to automated end-to-end testing computing platform 110; if the size of the application/testing files is below the threshold size, computing platform 130 may send the application/testing files to automated end-to-end testing computing platform 110 (or vice versa).

At step 222, automated end-to-end testing computing platform 110 may receive the second test configuration data sent by computing platform 130 at step 221. At step 223, automated end-to-end testing computing platform 110 may store the second test configuration data. Automated end-to-end testing computing platform 110 may store the second test configuration data locally (for example, in end-to-end testing database 112f). Alternatively, automated end-to-end testing computing platform 110 may utilize remote storage (not shown), such as a remote server or a remote database accessible via network 110. Automated end-to-end testing computing platform 110 may determine, in real-time, the storage location for the second test configuration data. Such a determination may be based on a comparison of the size of the second test configuration data and a threshold data storage size. For example, if the size of the second test configuration data is below the threshold data storage size, automated end-to-end testing computing platform 110 may store the second test configuration data, but if the size of the second test configuration data exceeds the threshold data storage size, automated end-to-end testing computing platform 110 may send the second test configuration data to remote storage (or vice versa). At step 224, automated end-to-end testing computing platform 110 may store second test data in the queue, discussed above with respect to step 212. The second test data stored by automated end-to-end testing computing platform 110 in the queue may include any of the data from the second test configuration data received by automated end-to-end testing computing platform 110 from computing platform 130 (for example, the trigger for the second test).

At step 225, computing platform 140 may receive a third test request. The third test request may be received by computing platform 140 via a graphical user interface displayed by computing platform 140, via an application executing on computing platform 140, via a message received by computing platform 140, or the like. The third test request may indicate that a user wants to run a software test (for example, test an application, test an application programming interface, test an website, or the like) via computing platform 140. Referring to FIG. 2F, at step 226, in response to receiving the third test request, computing platform 140 may send the third test request to automated end-to-end testing computing platform. Prior to sending the third test request, computing platform 140 may supplement the third test request to include additional data, such as data identifying computing platform 140 as the computing platform at which the third test request was received. Alternatively, computing platform 140 may send additional data to automated end-to-end testing computing platform 110 (such as data identifying computing platform 140 as the computing platform at which the third test request was received) separately from the third test request. At step 227, automated end-to-end testing computing platform 110 may receive the third test request sent by computing platform 140. Automated end-to-end testing computing platform 110 may parse and analyze the third test request.

At step 228, automated end-to-end testing computing platform 110 may generate a third test configuration graphical user interface based on its analysis at step 227. The third test configuration graphical user interface may include a plurality of graphical user interfaces to be displayed by computing platform 140 to obtain test configuration settings from the user for the third test. The configuration parameters may include the testing framework for the third test (for example, end-to-end testing, front end testing, back end testing), which test is to be run (for example, whether the third test is a predefined test provided by automated end-to-end testing computing platform 110 or a custom test provided by the user of computing platform 140), and one or more configuration parameters for the third test (for example, which browser the third test is to be run in, which version of the browser the third test may be using, a trigger for execution of the third test, a screen resolution for the third test, and/or the like). The contents of the third test configuration graphical user interface are discussed in further detail below in reference to FIGS. 3A-3H.

At step 229, automated end-to-end testing computing platform 110 may send the third test configuration graphical user interface generated by automated end-to-end testing computing platform 110 at step 228 to computing platform 140. Automated end-to-end testing computing platform 110 may identify computing platform 140 as the intended recipient of the third test configuration graphical user interface based on the data in the third test request received by automated end-to-end testing computing platform 110 from computing platform 140 at step 227. The third test configuration graphical user interface sent by automated end-to-end testing computing platform 110 to computing platform 140 at step 229 may include all or a subset of the graphical user interfaces discussed above with reference to step 228.

The sending of the third test configuration graphical user interface by automated end-to-end testing computing platform 110 to computing platform 140 at step 229 may cause computing platform 140 to display the third test configuration graphical user interface. Specifically, at step 230, computing platform 140 may receive the third test configuration graphical user interface from automated end-to-end testing computing platform 110. Referring to FIG. 2G, in response to receiving the third test configuration graphical user interface from automated end-to-end testing computing platform 110, computing platform 140 may, at step 231, display the third test configuration graphical user interface on a display screen associated with computing platform 140. As noted above with reference to step 228, the third test configuration graphical user interface may comprise a series of graphical user interfaces. Computing platform 140 may display the individual graphical user interfaces simultaneously or separately. Any number of the individual graphical user interfaces may be displayed simultaneously or separately.

At step 232, computing platform 140 may receive a set of third test configuration data via the third test configuration graphical user interface output to the display screen of computing platform 140. The set of third test configuration data may include one or more test configuration parameters for the third test, such as the browser, the browser version, the screen resolution, the trigger, and/or the like. The set of third configuration data may also include test-specific data—for example, if the user selected a predefined test provided by automated end-to-end testing computing platform 110, the set of third configuration data may include data required to run the predefined test (for example, a URL to be tested). The set of third test configuration data may also include the location of one or more testing files and/or application files associated with the third test. For example, if the user of computing platform 140 is using automated end-to-end testing computing platform 110 to run a custom test of a software application, the set of third test configuration data may include the storage location of the custom test file(s) and/or the software application file(s). In another example, if the user of computing platform 140 is using automated end-to-end testing computing platform 110 to run a predefined test of a software application, the set of third test configuration data may include the storage location of the software application file(s).

At step 233, computing platform 140 may send the third test configuration data to automated end-to-end testing computing platform 110. The third test configuration data may include any test configuration parameters and any test-specific data received by computing platform 140 via the third test configuration graphical user interface. The third test configuration data may also include the storage location(s) of one or more testing files and/or application files associated with third test. Alternatively, the third test configuration data may include the testing files and/or the application files. Computing platform 140 may determine whether to send the storage locations of the application/testing files based on the size of the files. In one example, a threshold size may be dynamically determined by computing platform 140 (or automated end-to-end testing computing platform 110) based on a current network bandwidth usage of network 110. In another example, the threshold size may be predetermined by automated end-to-end testing computing platform 110 or computing platform 140. If the size of the application/testing files exceeds the threshold size, computing platform 140 may send the storage location of the application/testing files to automated end-to-end testing computing platform 110; if the size of the application/testing files is below the threshold size, computing platform 140 may send the application/testing files to automated end-to-end testing computing platform 110 (or vice versa).

At step 234, automated end-to-end testing computing platform 110 may receive the third test configuration data sent by computing platform 140 at step 233. At step 235, automated end-to-end testing computing platform 110 may store the third test configuration data. Automated end-to-end testing computing platform 110 may store the third test configuration data locally (for example, in end-to-end testing database 112*f*). Alternatively, automated end-to-end testing computing platform 110 may utilize remote storage (not shown), such as a remote server or a remote database accessible via network 110. Automated end-to-end testing computing platform 110 may determine, in real-time, the storage location for the third test configuration data. Such a determination may be based on a comparison of the size of the third test configuration data and a threshold data storage size. For example, if the size of the third test configuration data is below the threshold data storage size, automated end-to-end testing computing platform 110 may store the third test configuration data, but if the size of the third test configuration data exceeds the threshold data storage size, automated end-to-end testing computing platform 110 may send the third test configuration data to remote storage (or vice versa). Referring to FIG. 2H, at step 236, automated end-to-end testing computing platform 110 may store third test data in the queue, discussed above with respect to step 212. The third test data stored by automated end-to-end testing computing platform 110 in the queue may include any of the data from the third test configuration data received by automated end-to-end testing computing platform 110 from computing platform 140 (for example, the trigger for the third test).

At step 237, automated end-to-end testing computing platform 110 may check the queue to determine which test stored therein, if any, is to be executed. For example, automated end-to-end testing computing platform 110 may check each test stored in the queue to determine if that test is ready for execution. Each test stored in the queue may comprise a corresponding trigger (the trigger may be received by automated end-to-end testing computing platform 110 as a part of the first test configuration data, second test configuration data, and/or third test configuration data received from computing platform 120, computing platform 130, and/or computing platform 140 at step(s) 210, 222, and/or 234, respectfully, and may be stored in the queue by automated end-to-end testing computing platform 110 at step(s) 212, 224, and/or 236). At step 237, automated end-to-end testing computing platform 110 may analyze each of the triggers to determine if the condition(s) defined therein is/are met.

In the example shown in FIGS. 2A-2M, the queue may include the first test, the second test, and the third test (stored in the queue by automated end-to-end testing computing platform 110 at steps 212, 224, and 236, respectively). The first test may be associated with a first trigger indicating that automated end-to-end testing computing platform 110 is to execute the first test every hour, starting at 8:00 am. At step 237, automated end-to-end testing computing platform 110 may determine if the timing conditions have been met for the first test. If the timing conditions for the first test have been met, automated end-to-end testing computing platform 110 may determine that the first test is to be executed. If the timing conditions for the first test have not been met, automated end-to-end testing computing platform 110 may determine that the first test is not be executed at this time.

The second test may be associated with a second trigger indicating that automated end-to-end testing computing platform 110 is to execute the second test every thirty minutes within a particular time window. At step 237, automated end-to-end testing computing platform 110 may determine if the timing conditions have been met for the second test. If the timing conditions for the second test have been met, automated end-to-end testing computing platform 110 may determine that the second test is to be executed. If the timing conditions for the second test have not been met, automated end-to-end testing computing platform 110 may determine that the second test is not be executed at this time.

The third test may be associated with a third trigger indicating that automated end-to-end testing computing platform 110 is to execute the third test if a software application that is the subject of the third test has been updated since the last testing of the software application. At step 237, automated end-to-end testing computing platform 110 may determine whether the software application has been updated since the last testing of the software application. In one example, automated end-to-end testing computing platform 110 may receive a notification from a computing platform, such as computing platform 140, every time the software application has been updated. If automated end-to-end testing computing platform 110 has received such a notification, then automated end-to-end testing computing platform 110 may determine at step 237 that the third test is to be executed. In another example, automated end-to-end testing computing platform 110 may query computing platform 140 (or another computing platform associated with the software application) to determine if the software application has been updated. If computing platform 140 indicates that the software application has been updated, then automated end-to-end testing computing platform 110 may determine at step 237 that the third test is to be executed. If computing platform 140 indicates that the software application has not been updated, then automated end-to-end testing computing platform 110 may determine that third test is not to be executed.

In the example shown in FIG. 2H, at step 237, automated end-to-end testing computing platform 110 may determine, based on the corresponding triggers, that the first test is to be executed, while the second test and the third test are not to be executed. At step 238, automated end-to-end testing computing platform 110 may analyze the data for the first test. The data to be analyzed may include the first test configuration data received by automated end-to-end testing computing platform 110 from computing platform 120 at step 210. Automated end-to-end testing computing platform 110 may analyze the data for the first test to determine if data from another test that has been previously executed by automated end-to-end testing computing platform 110 may be used during execution of the first test. Re-use of test data by automated end-to-end testing computing platform 110, where possible, may reduce the workload of automated end-to-end testing computing platform 110 (for example, minimizing the usage of processors 111 of automated end-to-end testing computing platform 110) by eliminating (or reducing) the need to unnecessarily perform the same test multiple times. This may increase the efficiency of the system by allowing automated end-to-end testing computing platform 110 to generate faster test results and by reducing the bandwidth usage of network 101.

In one example, the first test configuration data may indicate that the first test is a first predefined test provided by automated end-to-end testing computing platform 110. The first predefined test may be directed to testing a particular Uniform Resource Locator ("URL") to determine whether the URL is properly functioning. In this example, the first test configuration data received by automated end-to-end testing computing platform 110 from computing platform 120 at step 210 may have included the particular URL to be tested by the first test. At step 238, automated end-to-end testing computing platform 110 may analyze this URL (which may be stored in the queue, stored locally by automated end-to-end testing computing platform 110, or stored remotely, as discussed above with respect to step 211) to determine whether any other test executed by automated end-to-end testing computing platform 110 within the past hour (the results of which may be stored locally by automated end-to-end testing computing platform 110 or remotely) also tested whether the particular URL indicated by the first test was properly functioning. If automated end-to-end testing computing platform 110 did execute another test that also tested the functionality of the particular URL indicated by the first test, automated end-to-end testing computing platform 110 may use the results from that other test. If automated end-to-end testing computing platform 110 did not execute another test that also tested the functionality of the particular URL indicated by the first test, automated end-to-end testing computing platform 110 may run the first test. In this particular example, automated end-to-end testing computing platform 110 may determine, at step 238, that it has not executed another test whose results may be used by automated end-to-end testing computing platform 110 during execution of the first test.

At step 239, automated end-to-end testing computing platform 110 may dynamically generate a first container for the first test. Automated end-to-end testing computing platform 110 may be configured to execute its tests via containers. Automated end-to-end testing computing platform 110 may generate one or more containers for each test that is executed by automated end-to-end testing computing platform 110. Each container may be an independent package that includes all necessary data to execute the test contained therein (for example, the testing files, the software files to be tested, any configuration files for the test/software application, and/or the like). Automated end-to-end testing computing platform 110 may run any number of containers simultaneously across any of its processors 111. While each of the containers stores its own test data, the containers may share the operating system resources of processors 111.

In this example, the first container may include the first test configuration data received by automated end-to-end testing computing platform 110 from computing platform 120 at step 210, the first test, any software applications to be tested by the first test, any configuration data for the first test, and/or the like. If any of the first test data was stored remotely by automated end-to-end testing computing platform 110 at step 211, automated end-to-end testing computing platform 110 may, at step 239, retrieve that first test data for inclusion in the first container. The first container may be generated based on the analysis performed by automated end-to-end testing computing platform 110 at step 238. For example, if automated end-to-end testing computing platform 110 determined, at step 238, that result data from another test executed by automated end-to-end testing computing platform 110 is to be used during execution of the first test, automated end-to-end testing computing platform 110 may include that result data in the first container.

Once automated end-to-end testing computing platform 110 has generated the first container at step 239, automated end-to-end testing computing platform 110 may run the first container at step 240. Running the first container may comprise deploying the first container to one of the processors 111 of automated end-to-end testing computing platform 110, along with instructions to execute the first test stored within the first container. The automated end-to-end testing computing platform 110 may dynamically determine, at run-time, which particular processor of its processors 111 is to receive the first container.

The automated end-to-end testing computing platform 110 may make such a dynamic run-time determination based on a processor workload optimization model. The processor workload optimization model may be initially built using historical data including processing capabilities of the processors, processing requirements of different containers deployed by automated end-to-end testing computing platform 110, timing analysis of the different containers deployed by automated end-to-end testing computing platform 110, and/or the like. The processor workload optimization model may include a feedback loop utilized by automated end-to-end testing computing platform 110 to optimize the output of the processor workload optimization model. The feedback data utilized by automated end-to-end testing computing platform 110 to continuously train and optimize the processor workload optimization model may include the sizes of the deployed containers, the timing requirements of running those containers, the processing capabilities required to run those containers, and/or the like.

The automated end-to-end testing computing platform 110 may utilize processor workload optimization model at step 240 to determine which particular processor of processors 111 to deploy the first container to by inputting any number of parameters into the processor workload optimization model. For example, automated end-to-end testing computing platform 110 may input the size of the first container, the estimated processing requirements of executing the first test of the first container, and/or the like into the processor workload optimization model. The processor workload optimization model may, in turn, determine which particular processor, of processors 111, is to run the first container based on the inputted parameters, the current processing loads of each of the processors 111, the future processing loads of the processors 111, and/or historical performance data of processors 111 under conditions similar to their current operating conditions. In one example, the output of the processor workload optimization model may include a recommended particular processor, of processors 111, for deployment of the first container. In another example, the output of the processor workload optimization model may include a ranked list of recommended particular processors, of processors 111, for deployment of the first container.

In response to inputting the parameters to the processor workload optimization model and running the processor workload optimization model, automated end-to-end testing computing platform 110 may determine the particular processor, of processors 111, to which the first container is to be deployed. Thus, at step 240, automated end-to-end testing computing platform 110 may run the first container by deploying the first container to the particular processor of processors 111 recommended by the processor workload optimization model, along with instructions to execute the first test stored within the first container.

Referring to FIG. 2I, at step 241, automated end-to-end testing computing platform 110 may store the first test results. The first test results may be generated by the particular processor of automated end-to-end testing computing platform 110 on which the first container was deployed. Automated end-to-end testing computing platform 110 may store the first test results locally (for example, within E2E testing database 112f, or on remote storage (not shown)). Automated end-to-end testing computing platform 110 may dynamically determine where the first test results are to be stored based on the size of the first test results. For example, if the size of the first test results exceed a threshold size value, the first test results may be stored locally within automated end-to-end testing computing platform 110 but if the size of the first test results is below the threshold size value, automated end-to-end testing computing platform 110 may store the first test results remotely (or vice versa).

At step 242, automated end-to-end testing computing platform 110 may generate a first test report based on the first test results. The first test report may include all of the data from the first test results, or a subset of the data from the first test results. Automated end-to-end testing computing platform 110 may reformat or repackage any of the data from the first test results when adding the data to the first test report. At step 243, automated end-to-end testing computing platform 110 may send the first test report to computing platform 120. The sending of the first test report by automated end-to-end testing computing platform 110 to computing platform 120 may cause computing platform 120 to display the first test report. Specifically, at step 244, computing platform 120 may receive the first test report sent by automated end-to-end testing computing platform 110. In response to receiving the first test report sent by automated end-to-end testing computing platform 110, computing platform 120 may, at step 245, display the first test report on a display device of computing platform 120. The contents of a test report generated by automated end-to-end testing computing platform 110, such as the first test report, is discussed in detail below with reference to FIG. 4.

Referring to FIG. 2J, at step 246, automated end-to-end testing computing platform 110 may deactivate the first container. Automated end-to-end testing computing platform 110 may deactivate the first container in response to sending the first test result to computing platform 120 or in response to receiving the first test results from the particular processor on which the first container was run. Automated end-to-end testing computing platform 110 may deactivate the first container by deleting the first container and any data contained therein, or by indicating that any memory currently being utilized for storing first container may be available to store new data. Automated end-to-end testing computing platform 110 may also, in response to sending the first test report to computing platform 120 or in response to receiving the first test results from the particular processor on which the first container was run, remove the first test from the queue at step 246.

At step 247, automated end-to-end testing computing platform 110 may check the queue to determine which test stored therein, if any, is to be executed. As discussed above with reference to step 237, automated end-to-end testing computing platform 110 may check each test stored in the queue to determine if the test is ready for execution based on a trigger associated with that test. In the example shown in FIGS. 2A-2M, the queue initially included the first test, the second test, and the third test. Automated end-to-end testing computing platform 110 subsequently removed the first test from the queue at step 246. Thus, at step 247, the queue may comprise the second test and the third test. Further in this example, and as discussed above with reference to step 237, the second test may be associated with a second trigger indicating that automated end-to-end testing computing platform 110 is to execute the second test every thirty minutes within a particular time window and the third test may be associated with a third trigger indicating that automated end-to-end testing computing platform 110 is to execute the third test if a software application that is the subject of the third test has been updated since the last testing of the software application.

At step 247, automated end-to-end testing computing platform 110 may determine if the timing conditions have been met for the second test. If the timing conditions for the second test have been met, automated end-to-end testing computing platform 110 may determine that the second test is to be executed. If the timing conditions for the second test have not been met, automated end-to-end testing computing platform 110 may determine that the second test is not be executed at this time.

Further at step 247, automated end-to-end testing computing platform 110 may determine whether the software application has been updated since the last testing of the software application. The automated end-to-end testing computing platform 110 may make such a determination based on whether automated end-to-end testing computing platform 110 has received a notification from a computing platform, such as computing platform 140 indicating that the software application has been updated, or by querying computing platform 140 (or another computing platform associated with the software application) to determine if the software application has been updated, similar to the discussion above with reference to step 237.

In the example shown in FIG. 2J, at step 247, automated end-to-end testing computing platform 110 may determine that the second test is to be executed and that the third test is not to be executed. At step 248, automated end-to-end testing computing platform 110 may analyze the data for the second test. The data for the second test may include the second test configuration data received by automated end-to-end testing computing platform 110 at step 222. Automated end-to-end testing computing platform 110 may analyze the data for the second test to determine if data from another test that has been previously executed by automated end-to-end testing computing platform 110 may be used during execution of the second test. In this example, automated end-to-end testing computing platform 110 may analyze the data for the first test and the data for the second test (including the first test configuration data received by automated end-to-end testing computing platform 110 at step 210 and the second test configuration data received by automated end-to-end testing computing platform 110 at step 222) to determine if any of the test result data from the first test may be reused in the execution of the second test.

As discussed above with reference to step 237, in this example, the second test may be a first predefined test provided by automated end-to-end testing computing platform 110 and directed to testing a particular Uniform Resource Locator ("URL") to determine whether the URL is properly functioning. In this example, the second test configuration data sent from computing platform 130 to automated end-to-end testing computing platform 110 at step 210 may have included the particular URL to be tested by the second test. At step 238, automated end-to-end testing computing platform 110 may analyze this URL (which may be stored in the queue, stored locally by automated end-to-end testing computing platform 110, or stored remotely, as discussed above with respect to step 224) to determine whether any other test executed by automated end-to-end testing computing platform 110 (the results of which may be stored locally by automated end-to-end testing computing platform 110 or remotely) also tested whether the particular URL indicated by the second test was properly functioning. If automated end-to-end testing computing platform 110 did execute another test that also tested the functionality of the particular URL indicated by the second test, automated end-to-end testing computing platform 110 may use the results from that other test. If automated end-to-end testing computing platform 110 did not execute another test that also tested the functionality of the particular URL indicated by the second test, automated end-to-end testing computing platform 110 may run the second test anew.

In this particular example, automated end-to-end testing computing platform 110 may determine, at step 248, that the particular URL indicated in the second test data is the same as the particular URL indicated in the first test data received by automated end-to-end testing computing platform 110 at step 210 and tested by automated end-to-end testing computing platform 110 at step 240. In response to determining that the same URL to be tested as a part of the second test was previously tested in the first test, automated end-to-end testing computing platform 110 may determine whether the date and time of the first test results are acceptable for reuse within the second test. For example, if the second test requires that the URL be tested every thirty minutes and the first test was executed within the past thirty minutes, the first test results may be used in the second test; otherwise, the data may not be re-used. In this example, automated end-to-end testing computing platform 110 may determine that a subset of the data from the first test may be re-used during the second test.

If the first test and the second test are identical and the result data from the first test can be re-used for the second test, processing may proceed directly to step 253. However, if the second test data comprises additional testing requirements (for example, the testing of multiple URLs, at least one of which has not been previously tested within an acceptable timeframe by the automated end-to-end testing computing platform 110), then processing continues to step 249. In this example, based on the contents of the second test data and the first test data, automated end-to-end testing computing platform 110 may determine that the second test data has additional testing requirements so processing may proceed to step 249.

At step 249, automated end-to-end testing computing platform 110 may dynamically generate a second container for the second test. In this example, the second container may include the second test configuration data received by automated end-to-end testing computing platform 110 from computing platform 130 at step 222, the second test, any software applications to be tested by the second test, any configuration data for the second test, and/or the like. If any of the second test data was stored remotely by automated end-to-end testing computing platform 110 at step 223, automated end-to-end testing computing platform 110 may, at step 249, retrieve that second test data for inclusion in the second container. The second container may be generated based on the analysis performed by automated end-to-end testing computing platform 110 at step 248. For example, if automated end-to-end testing computing platform 110 determined, at step 248, that result data from another test executed by automated end-to-end testing computing platform 110 is to be used during execution of the second test, automated end-to-end testing computing platform 110 may include that result data in the second container. In this example, automated end-to-end testing computing platform 110 may include, within the second container, the first test results generated as a result of the running of the first container by a processor of automated end-to-end testing computing platform 110 at step 240.

Once automated end-to-end testing computing platform 110 has generated the second container at step 249, automated end-to-end testing computing platform 110 may run the second container at step 250. Running the second container may comprise deploying the second container to one of the processors 111 of automated end-to-end testing computing platform 110, along with instructions to execute the second test stored within the second container. The automated end-to-end testing computing platform 110 may dynamically determine, at run-time, which particular processor of its processors 111 is to receive the second container.

As discussed above with reference to step 240, the automated end-to-end testing computing platform 110 may utilize the processor workload optimization model at step 250 to determine which particular processor of processors 111 to deploy the second container by inputting any number of parameters into the processor workload optimization model. For example, automated end-to-end testing computing platform 110 may input the size of the second container, the estimated processing requirements of executing the second test of the second container, and/or the like into the processor workload optimization model. The processor workload optimization model may, in turn, determine which particular processor, of processors 111, is to run the second container based on the inputted parameters, the current processing loads of each of the processors 111, the future processing loads of the processors 111, and historical performance data of processors 111 under conditions similar to their current operating conditions. In one example, the output of the processor workload optimization model may include a recommended particular processor, of processors 111, for deployment of the second container. In another example, the output of the processor workload optimization model may include a ranked list of recommended particular processors, of processors 111, for deployment of the second container.

In response to inputting the data to the processor workload optimization model and running the processor workload optimization model, automated end-to-end testing computing platform 110 may determine the particular processor, of processors 111, to which the second container is to be deployed. Thus, at step 250, automated end-to-end testing computing platform 110 may run the second container by deploying the second container to the particular processor of automated end-to-end testing computing platform 110 recommended by the processor workload optimization model, along with instructions to execute the second test stored within the second container.

Referring to FIG. 2K, at step 251, automated end-to-end testing computing platform 110 may store the second test results. The second test results may be generated by the particular processor of automated end-to-end testing computing platform 110 on which the second container was deployed. Automated end-to-end testing computing platform 110 may store the second test results locally (for example, within E2E testing database 112f, or on remote storage (not shown). Automated end-to-end testing computing platform 110 may dynamically determine where the second test results are to be stored based on the size of the second test results. For example, if the size of the second test results exceed a threshold size value, the second test results may be stored locally within automated end-to-end testing computing platform 110 but if the size of the second test results is below the threshold size value, automated end-to-end testing computing platform 110 may store the second test results remotely (or vice versa).

At step 252, automated end-to-end testing computing platform 110 may generate a second test report based on the second test results. The second test report may include all of the data from the second test results, a subset of the data from the second test results, and/or the first test result(s) that were used in the second test. Automated end-to-end testing computing platform 110 may reformat or repackage any of the data from the second test results when adding the data to the second test report. At step 253, automated end-to-end testing computing platform 110 may send the second test report to computing platform 130. The sending of the second test report by automated end-to-end testing computing platform 110 to computing platform 130 may cause computing platform 130 to display the second test report. Specifically, at step 254, computing platform 130 may receive the second test report sent by automated end-to-end testing computing platform 110. In response to receiving the second test report sent by automated end-to-end testing computing platform 110, computing platform 130 may, at step 255, display the second test report on a display device of computing platform 130. The contents of a test report generated by automated end-to-end testing computing platform 110, such as the second test report, is discussed in detail below with reference to FIG. 4.

Regarding FIG. 2L, at step 256, automated end-to-end testing computing platform 110 may deactivate the second container. Automated end-to-end testing computing platform 110 may deactivate the second container by deleting the second container and any data contained therein, or by indicating that any memory currently being utilized for storing second container may be available to store new data. Automated end-to-end testing computing platform 110 may also, in response to sending the second test report to computing platform 130 or in response to receiving the second test results from the particular processor on which the second container was run, remove the second test from the queue at step 256.

At step 257, automated end-to-end testing computing platform 110 may check the queue to determine which test stored therein, if any, is to be executed. As discussed above with reference to step 237, automated end-to-end testing computing platform 110 may check each test stored in the queue to determine if the test is ready for execution based on a trigger associated with that test. In the example shown in FIGS. 2A-2M, the queue initially included the first test, the second test, and the third test. Automated end-to-end testing computing platform 110 removed the first test from the queue at step 246 and then removed the second test from the queue at step 256. Thus, at step 257, the queue may comprise the third test. Further in this example, and as discussed above with reference to step 237, the third test may be associated with a third trigger indicating that automated end-to-end testing computing platform 110 is to execute the third test if a software application that is the subject of the third test has been updated since the last testing of the software application.

At step 257, automated end-to-end testing computing platform 110 may determine if the software application to be tested by the third test has been updated since the last testing of the software application. The automated end-to-end testing computing platform 110 may make such a determination based on whether automated end-to-end testing computing platform 110 has received a notification from a computing platform, such as computing platform 140 indicating that the software application has been updated, or by querying computing platform 140 (or another computing platform associated with the software application) to determine if the software application has been updated, similar to the discussion above with reference to step 237.

In the example shown in FIG. 2L, at step 257, automated end-to-end testing computing platform 110 may determine that the third test is to be executed based on determining that automated end-to-end testing computing platform 110 received a notification indicating that the software application has been updated since the last testing of the software application. At step 258, automated end-to-end testing computing platform 110 may analyze the data for the third test. The data for the third test to be analyzed may include the third test configuration data received by automated end-to-end testing computing platform 110 from computing platform 140 at step 235. Automated end-to-end testing computing platform 110 may analyze the data for the third test to determine if data from another test that has been previously executed by automated end-to-end testing computing platform 110 may be used during execution of the third test. Automated end-to-end testing computing platform 110 may analyze the contents of the testing file of the third test, and may compare those contents to the contents of other testing files that have been sent to automated end-to-end testing computing platform 110 from computing platforms. In this particular example, automated end-to-end testing computing platform 110 may determine, at step 258, that there is no data from another test executed by automated end-to-end testing computing platform 110 that may be reused during execution of the third test.

At step 259, automated end-to-end testing computing platform 110 may dynamically generate a third container for the third test. In this example, the third container may include the third test configuration data received by automated end-to-end testing computing platform 110 from computing platform 140 at step 234, the third test, any software applications to be tested by the third test, any configuration data for the third test, and/or the like. If any of the third test data was stored remotely by automated end-to-end testing computing platform 110 at step 235, automated end-to-end testing computing platform 110 may, at step 259, retrieve that third test data for inclusion in the third container. The third container may be generated based on the analysis performed by automated end-to-end testing computing platform 110 at step 258. For example, if automated end-to-end testing computing platform 110 determined, at step 258 that result data from another test executed by automated end-to-end testing computing platform 110 is to be used during execution of the third test, automated end-to-end testing computing platform 110 may include that result data in the third container.

Once automated end-to-end testing computing platform 110 has generated the third container at step 259, automated end-to-end testing computing platform 110 may run the third container at step 260. Running the third container may comprise deploying the third container to one of the processors 111 of automated end-to-end testing computing platform 110, along with instructions to execute the third test stored within the third container. The automated end-to-end testing computing platform 110 may dynamically determine, at run-time, which particular processor of its processors 111 is to receive the third container.

As discussed above with reference to step 240, the automated end-to-end testing computing platform 110 may utilize the processor workload optimization model at step 260 to determine which particular processor of processors 111 to deploy the third container by inputting any number of parameters into the processor workload optimization model. For example, automated end-to-end testing computing platform 110 may input the size of the third container, the estimated processing requirements of executing the third test of the third container, and/or the like into the processor workload optimization model. The processor workload optimization model may, in turn, determine which particular processor, of processors 111, is to run the third container based on the inputted parameters, the current processing loads of each of the processors 111, the future processing loads of the processors 111, and historical performance data of processors 111 under conditions similar to their current operating conditions. In one example, the output of the processor workload optimization model may include a recommended particular processor, of processors 111, for deployment of the third container. In another example, the output of the processor workload optimization model may include a ranked list of recommended particular processors, of processors 111, for deployment of the third container.

In response to inputting the data to the processor workload optimization model and running the processor workload optimization model, automated end-to-end testing computing platform 110 may determine the particular processor, of processors 111, to which the third container is to be deployed. Thus, at step 260, automated end-to-end testing computing platform 110 may run the third container by deploying the third container to the particular processor of automated end-to-end testing computing platform 110 recommended by the processor workload optimization model, along with instructions to execute the third test stored within the third container.

Referring to FIG. 2M, at step 261, automated end-to-end testing computing platform 110 may store the third test results. The third test results may be generated by the particular processor of automated end-to-end testing computing platform 110 on which the third container was deployed. Automated end-to-end testing computing platform 110 may store the third test results locally (for example, within E2E testing database 112f, or on remote storage (not shown). Automated end-to-end testing computing platform 110 may dynamically determine where the third test results are to be stored based on the size of the third test results. For example, if the size of the third test results exceed a threshold size value, the third test results may be stored locally within automated end-to-end testing computing platform 110 but if the size of the third test results is below the threshold size value, automated end-to-end testing computing platform 110 may store the third test results remotely (or vice versa).

At step 262, automated end-to-end testing computing platform 110 may generate a third test report based on the third test results. The third test report may include all of the data from the third test results or a subset of the data from the third test results. Automated end-to-end testing computing platform 110 may reformat or repackage any of the data from the third test results when adding the data to the third test report. At step 263, automated end-to-end testing computing platform 110 may send the third test report to computing platform 140. The sending of the third test report by automated end-to-end testing computing platform 110 to computing platform 140 may cause computing platform 140 to display the third test report. Specifically, at step 264, computing platform 140 may receive the third test report sent by automated end-to-end testing computing platform 110. In response to receiving the third test report sent by automated end-to-end testing computing platform 110, computing platform 140 may, at step 265, display the third test report on a display device of computing platform 140. The contents of a test report generated by automated end-to-end testing computing platform 110, such as the third test report, is discussed in detail below with reference to FIG. 4.

Referring to FIG. 2N, at step 266, automated end-to-end testing computing platform 110 may deactivate the third container. Automated end-to-end testing computing platform 110 may deactivate the third container by deleting the third container and any data contained therein, or by indicating that any memory currently being utilized for storing third container may be available to store new data. Automated end-to-end testing computing platform 110 may also, in response to sending the third test report to computing platform 140 or in response to receiving the third test results from the particular processor on which the third container was run, remove the third test from the queue at step 266.

At step 267, automated end-to-end testing computing platform 110 may update the processor workload optimization model. As discussed above with reference to step 240, the processor workload optimization model may include a feedback loop utilized by automated end-to-end testing computing platform 110 to optimize the output of the processor workload optimization model by continuously training the model with updated data. The feedback data utilized by automated end-to-end testing computing platform 110 to continuously train and optimize the processor workload optimization model may include the size of the containers it deployed, the timing requirements of running those containers, the processing capabilities required to run those containers, and/or the like. Thus, in this example, automated end-to-end testing computing platform 110 may update, via the feedback loop, the processor workload optimization model using the size of the first container, the running time for the first container, the processing power utilized to run the first container, the size of the second container, the running time for the second container, the processing power utilized to run the second container, the size of the third container, the running time for the third container, and/or the processing power utilized to run the third container. These data points may be used to update the processor workload optimization model to produce a more optimal processor recommendation in the future. Though this example shows automated end-to-end testing computing platform 110 updating the processor workload optimization model after step 266 (e.g., after multiple tests have been executed by automated end-to-end testing computing platform 110), the updating may occur more frequently (for example, automated end-to-end testing computing platform 110 may update the processor workload optimization model each time it executes a test) or may occur based on different parameters (for example, it may occur at a predetermined time interval, such as hourly, daily, weekly, monthly, or the like).

FIGS. 3A-3G illustrate graphical user interfaces that may be generated by automated end-to-end testing computing platform 110 in response to receiving a test request from a computing platform, such as computing platform 120, computing platform 130, and/or computing platform 140. Automated end-to-end testing computing platform 110 may generate the graphical user interfaces shown in FIGS. 3A-3G and send the graphical user interfaces to any of computing platform 120, computing platform 130, and/or computing platform 140. The sending of the graphical user interfaces by automated end-to-end testing computing platform 110 may cause computing platform 120, computing platform 130, and/or computing platform 140 to display the graphical user interfaces on an associated display screen. The graphical user interfaces may be presented simultaneously or separately by computing platform 120, computing platform 130, and/or computing platform 140.

Figure 3A:
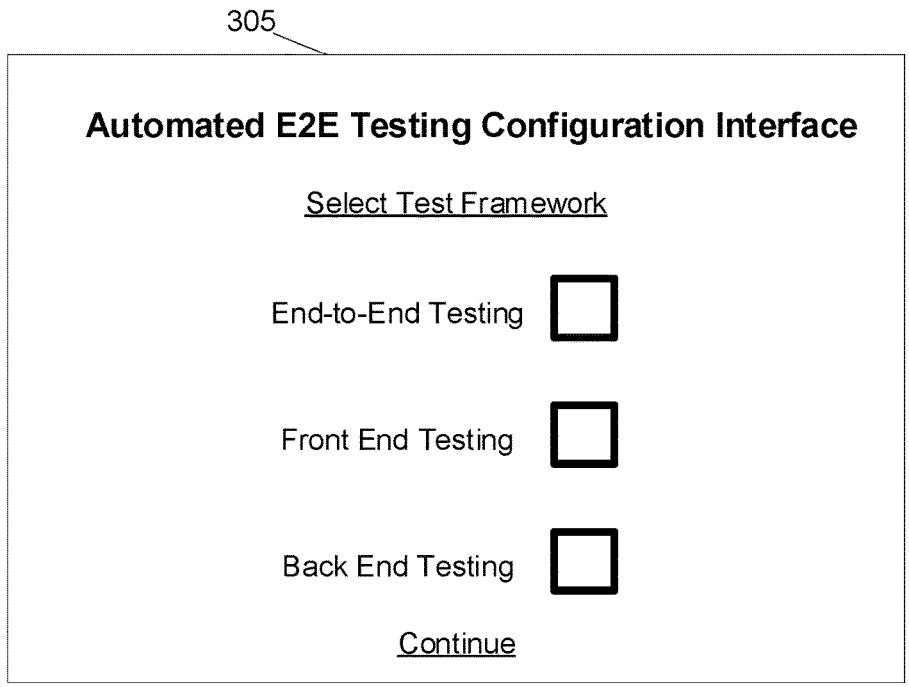
Figure 3B:
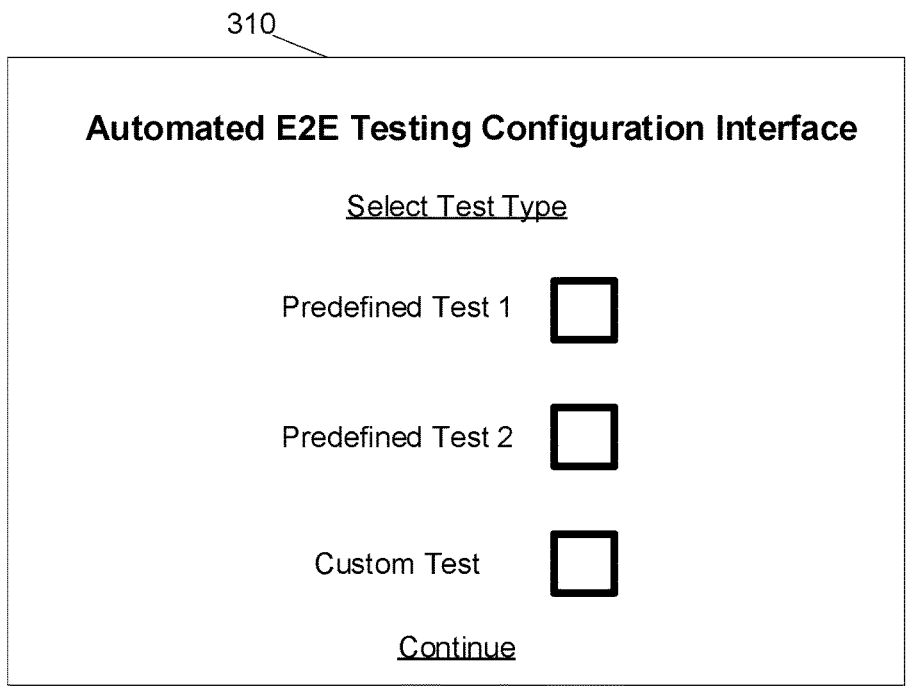

Referring to FIG. 3A, the graphical user interface 305 may comprise an initial test configuration screen comprising a list of selectable test frameworks offered by automated end-to-end testing computing platform 110. Though only three example frameworks are shown in FIG. 3A (end-to-end testing, front end testing, and back end testing), greater or fewer frameworks may be listed in graphical user interface 305. Referring to FIG. 3B, graphical user interface 310 may comprise a test configuration screen comprising a list of selectable test types offered by automated end-to-end testing computing platform 110. Automated end-to-end testing computing platform 110 may be configured to allow a user to select one or more predefined tests (for example, testing a URL to determine whether the URL is properly functioning, testing a particular system to determine whether an application programming interface associated with the particular system is properly functioning, testing a website, and/or the like). Automated end-to-end testing computing platform 110 may additionally be configured to allow a user to select a custom test (for example, a custom test for a software application). Although only two predefined tests are shown in FIG. 3B, graphical user interface 310 may include a greater or fewer number of predefined tests based on the particular configuration of automated end-to-end testing computing platform 110.

Referring to FIG. 3C, graphical user interface 315 may comprise a list of selectable browser(s) that may be displayed on a display screen of a computing platform in response to the user selecting a front end testing framework in graphical user interface 305. The user may select any one or more of the selectable browsers to be used during the test. For example, if the user wants to test the display of a website within three different browsers, the user may select all three browsers shown in graphical user interface 315. Although three browsers are shown in graphical user interface 315, a greater or fewer number of browsers may be displayed depending on the particular configuration of automated end-to-end testing computing platform 110.

Referring to FIG. 3D, graphical user interface 320 may comprise a list of selectable browser version(s) for each of the user-selected browsers shown in FIG. 3C. Within graphical user interface 320, the user may select the particular versions for each of the three user-selected browsers of graphical user interface 215. The number of versions for each browser may vary based on the versions available for that particular browser. The particular contents of graphical user interface 320 will vary based on the user selections in graphical user interface 315. In this example, if the user selects all three browsers shown in graphical user interface 315, the available browser versions for all three browsers may be displayed in graphical user interface 320. However, if the user selects only a subset of the browsers in graphical user interface 315, then the display of graphical user interface 320 may correspondingly comprise only the available versions of the subset of the selected browsers.

Figure 3E:
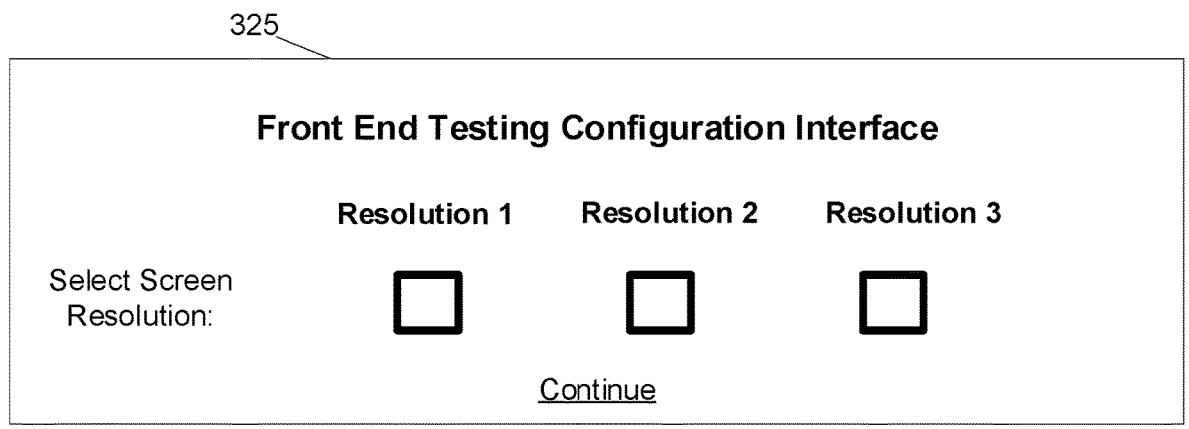
Figure 3F:
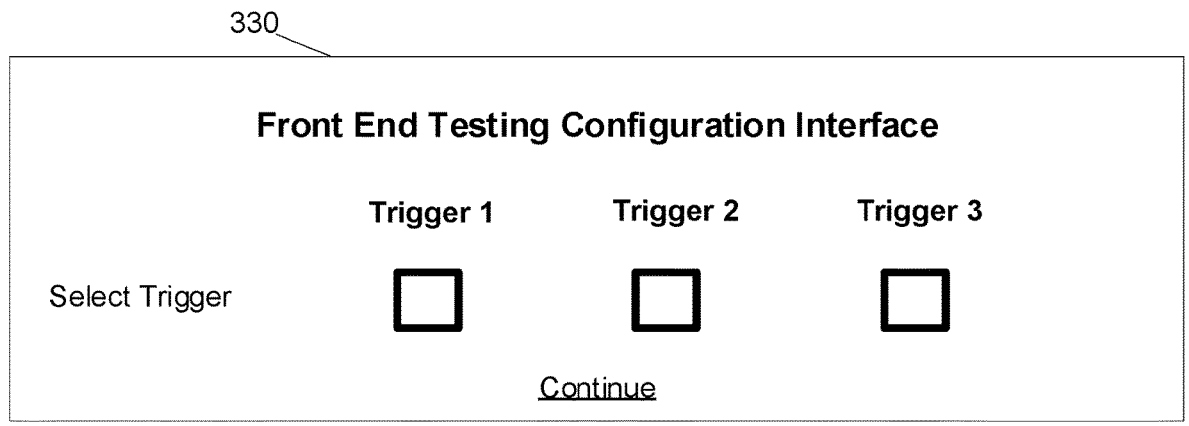

Referring to FIG. 3E, graphical user interface 325 may comprise a list of selectable screen resolutions to be tested. For example, if the user wants to test the display of a website on two different screen resolutions for two different devices (for example, a mobile device and a desktop computer), then the user may select the two different screen resolutions corresponding to the screen resolutions of the two different devices. Referring to FIG. 3F, graphical user interface 330 may comprise a list of selectable triggers for the test. Although three selectable triggers are shown, a greater or fewer number of triggers may be displayed within graphical user interface 330 depending on the particular configuration of automated end-to-end testing computing platform 110. The triggers may be time-based triggers (for example, the user may specify that the test is to be run hourly) or event-based triggers (for example, the user may specify that the test is to be run each time the software application to be tested is updated).

Referring to FIG. 3G, graphical user interface 335 may allow a user to select one or more testing files to be uploaded and sent to automated end-to-end testing computing platform 110 by any of computing platform 120, computing platform 130, and/or computing platform 140. The testing files may include one or more files comprising one or more tests, one or more files comprising a software application, and/or the like. The user may enter the location of the testing files in the boxes shown on the right or may select the arrow to browse for available testing files. Referring to FIG. 3H, graphical user interface 340 may allow a user to input testing data for one or more the user-selected predefined tests shown in graphical user interface 310. The particular contents of graphical user interface 340 may vary based on the particular predefined tests selected by the user in graphical user interface 310. For example, if the user selects a first predefined test that allows a user to test the functionality of a plurality of URLs, the user may enter the URLs to be tested into graphical user interface 340.

Figure 4:
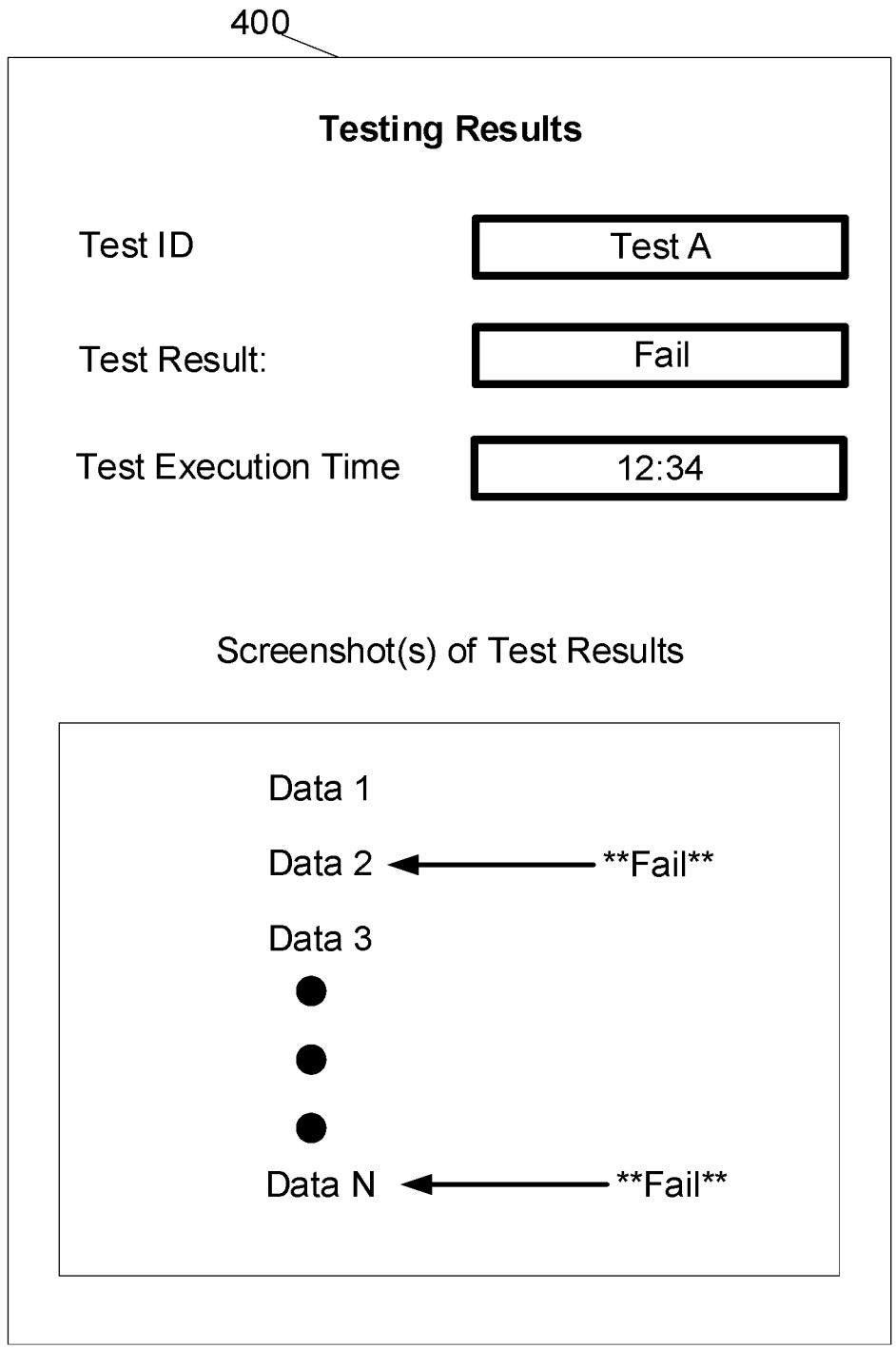
FIG. 4 depicts an illustrative test report generated by an automated end-to-end testing computing platform in accordance with one or more example embodiments.

Referring to FIG. 4, graphical user interface 400 illustrates a test report that may be generated by automated end-to-end testing computing platform 110 and sent to any of computing platform 120, computing platform 130, and/or computing platform 140. Graphical user interface 400 may comprise a Test ID field identifying the particular test associated with the test report. Graphical user interface 400 may further comprise an indication of the test result (for example, whether the test passed or failed). Other metrics may be used based on the particular test selected by the user. Graphical user interface 400 may further comprise an indication of the test execution time. Graphical user interface 400 may further comprise a screenshot of any relevant test results. For example, if the test failed, the screenshot may highlight the particular line(s) of code that resulted in a failure. These particular lines may be highlighted using color, font size, font type, or explicit labeling (shown). In another example, if the test was directed to testing the display of a website in different screen resolutions, graphical user interface 400 may comprise a different screenshot of the website for each of the different screen resolutions.

Figure 5:
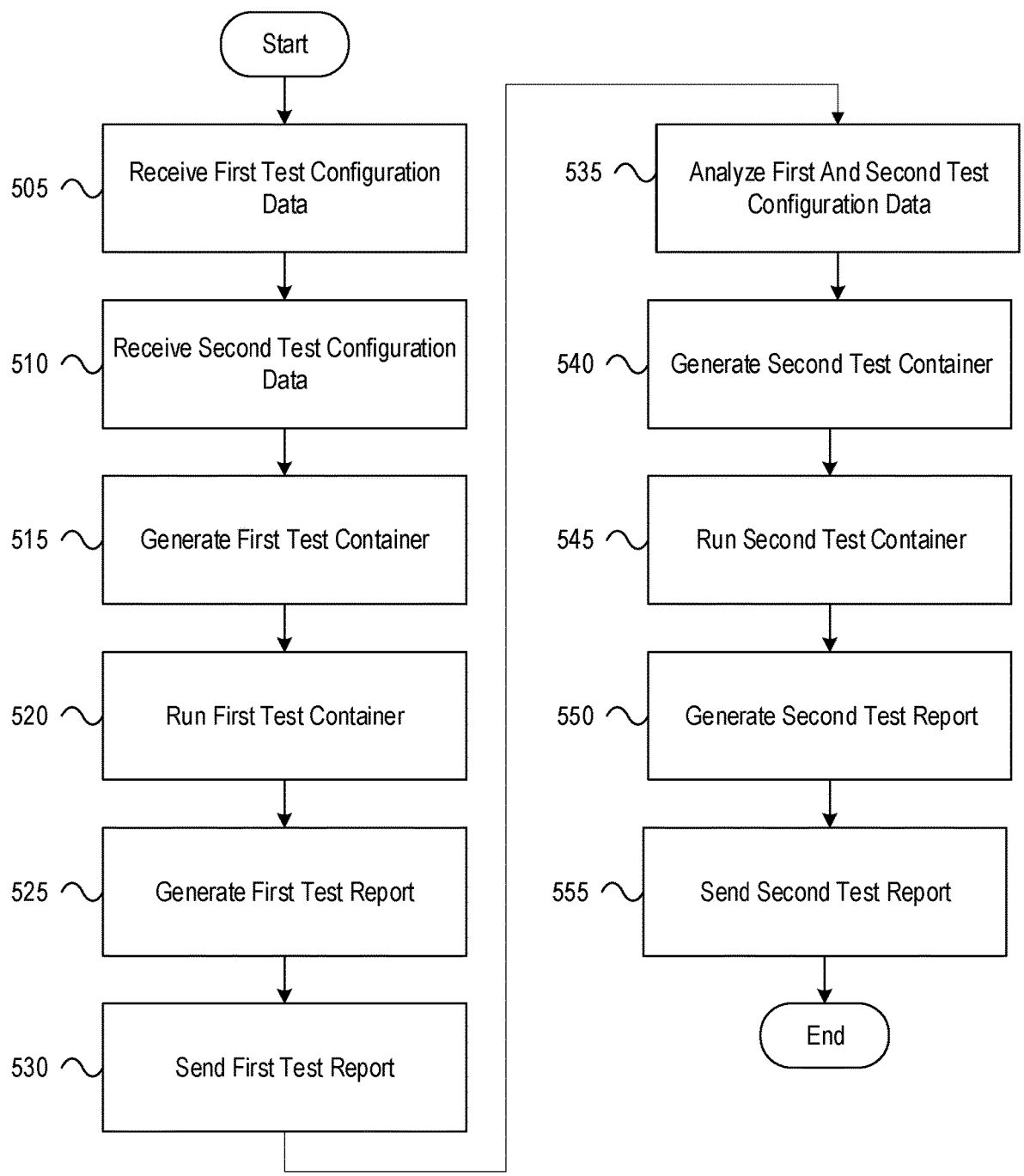
FIG. 5 depict an illustrative method for implementing an automated end-to-end testing computing platform in accordance with one or more example embodiments.

FIG. 5 depicts an illustrative method for implementing an automated end-to-end testing computing platform in accordance with one or more example embodiments. Referring to FIG. 5, at step 505, a computing platform having at least one processor, a communication interface, and memory may receive first test configuration data for a first test from a first computing platform. At step 510, the computing platform may receive second test configuration data for a second test from a second computing platform. At step 515, the computing platform may generate a first test container for the first test based on the first test configuration data and an analysis of the first test configuration data. The computing platform may analyze the first test configuration data to determine if test results from a different test executed by the computing platform may be reused during execution of the first test. At step 520, the computing platform may run the first test container by deploying the first container to a selected processor along with instructions to execute the first test stored within the first container. The computing platform may select the processor on which the first container is to be run using a processor workload optimization model. At step 525, the computing platform may generate a first test report based on the test results of the first test. At step 530, the computing platform may send the first test report to the first computing platform. Sending the first test report to the first computing platform may cause the first computing platform to display the first test report on a display screen of the first computing platform.

At step 535, the computing platform may analyze at least the first test configuration data and the second test configuration data to determine if any portion of the test results of the first test may be reused during execution of the second test. At step 540, the computing platform may generate a second test container for the second test based on the second test configuration data and the analysis of the first test configuration data and the second test configuration data. At step 545, the computing platform may run the second test container by deploying the second container to a selected processor along with instructions to execute the second test stored within the second container. The computing platform may select the processor on which the second container is to be run using a processor workload optimization model. At step 550, the computing platform may generate a second test report based on the test results of the second test. At step 555, the computing platform may send the second test report to the second computing platform. Sending the second test report to the second computing platform may cause the second computing platform to display the second test report on a display screen of the second computing platform.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An automated testing computing platform comprising:
   at least one processor;
   a communication interface communicatively coupled to the at least one processor; and
   memory storing computer-readable instructions that, when executed by the at least one processor, cause the automated testing computing platform to:
   receive, from a first computing platform, first test configuration data for a first test;
   receive, from a second computing platform, second test configuration data for a second test;
   determine that the first test is to be executed;
   in response to determining that the first test is to be executed, generate a first container based on the first test configuration data;
   run the first container to generate a first set of test results;
   generate a first test report based on the first set of test results;
   send the first test report to the first computing platform, wherein the sending the first test report to the first computing platform causes the first computing platform to display the first set of test results;
   analyze the first test configuration data and the second test configuration data;
   based on analyzing the first test configuration data and the second test configuration data, determine that a subset of the first set of test results is to be used during an execution of the second test;
   determine that the second test is to be executed;
   in response to determining that the second test is to be executed, and based on determining that the subset of the first set of test results is to be used during the execution of the second test, generate a second container based on the second test configuration data and the subset of the first set of test results;
   run the second container to generate a second set of test results;
   generate a second test report based on the second set of test results; and
   send the second test report to the second computing platform, wherein the sending the second test report to the second computing platform causes the second computing platform to display the second set of test results.

2. The automated testing computing platform of claim 1, wherein the first test configuration data for the first test is received from the first computing platform in response to the automated testing computer platform sending a first graphical user interface to the first computing platform, and wherein the sending the first graphical user interface to the first computing platform causes the first computing platform to display the first graphical user interface.

3. The automated testing computing platform of claim 2, wherein the first graphical user interface comprises a plurality of selectable triggers for the first test.

4. The automated testing computing platform of claim 3, wherein the first test configuration data comprises a first trigger of the plurality of selectable triggers.

5. The automated testing computing platform of claim 4, wherein the determining that the first test is to be executed is based on the first trigger.

6. The automated testing computing platform of claim 2, wherein the first graphical user interface comprises a plurality of selectable browsers for the first test.

7. The automated testing computing platform of claim 6, wherein the first test configuration data comprises a user selection identifying a first browser of the plurality of selectable browsers.

8. The automated testing computing platform of claim 7, where the first container comprises the first browser based on the first test configuration data comprising the user selection identifying the first browser.

9. The automated testing computing platform of claim 1, the memory storing computer-readable instructions that, when executed by the at least one processor, cause the automated testing computing platform to:
   select, based on the first container and based on an available capacity of each of a plurality of processors, a first processor from the plurality of processors,
   wherein running the first container comprises running the first container on the first processor.

10. The automated testing computing platform of claim 9, the memory storing computer-readable instructions that, when executed by the at least one processor, cause the automated testing computing platform to:
    select, based on the second container and based on the available capacity of each of the plurality of processors, a second processor from the plurality of processors,
    wherein running the second container comprises running the second container on the second processor.

11. A method comprising:
    at an automated testing computing platform comprising at least one processor, a communication interface, and memory:
    receiving, from a first computing platform, first test configuration data for a first test;
    receiving, from a second computing platform, second test configuration data for a second test;
    determining that the first test is to be executed;
    in response to determining that the first test is to be executed, generating a first container based on the first test configuration data;
    running the first container to generating a first set of test results;
    generating a first test report based on the first set of test results;
    sending the first test report to the first computing platform, wherein the sending the first test report to the first computing platform causes the first computing platform to display the first set of test results;
    analyzing the first test configuration data and the second test configuration data;
    based on analyzing the first test configuration data and the second test configuration data, determining that a subset of the first set of test results is to be used during an execution of the second test;
    determining that the second test is to be executed;
    in response to determining that the second test is to be executed, and based on determining that the subset of the first set of test results is to be used during the execution of the second test, generating a second container based on the second test configuration data and the subset of the first set of test results;

running the second container to generating a second set of test results;

generating a second test report based on the second set of test results; and sending the second test report to the second computing platform, wherein the sending the second test report to the second computing platform causes the second computing platform to display the second set of test results.

12. The method of claim 11, wherein the first test configuration data for the first test is received from the first computing platform in response to the automated testing computer platform sending a first graphical user interface to the first computing platform, and wherein the sending the first graphical user interface to the first computing platform causes the first computing platform to display the first graphical user interface.

13. The method of claim 12, wherein the first graphical user interface comprises a plurality of selectable triggers for the first test.

14. The method of claim 13, wherein the first test configuration data comprises a first trigger of the plurality of selectable triggers.

15. The method of claim 14, wherein the determining that the first test is to be executed is based on the first trigger.

16. The method of claim 12, wherein the first graphical user interface comprises a plurality of selectable browsers for the first test.

17. The method of claim 16, wherein the first test configuration data comprises a user selection identifying a first browser of the plurality of selectable browsers.

18. The method of claim 17, where the first container comprises the first browser based on the first test configuration data comprising the user selection identifying the first browser.

19. The method of claim 11, further comprising:
selecting, based on the first container and based on an available capacity of each of a plurality of processors, a first processor from the plurality of processors,
wherein running the first container comprises running the first container on the first processor.

20. One or more non-transitory computer-readable media storing instructions that, when executed by an automated testing computing platform comprising at least one processor, a communication interface, and memory, cause the automated testing computing platform to:

receive, from a first computing platform, first test configuration data for a first test;

receive, from a second computing platform, second test configuration data for a second test;

determine that the first test is to be executed;

in response to determining that the first test is to be executed, generate a first container based on the first test configuration data;

run the first container to generate a first set of test results;

generate a first test report based on the first set of test results;

send the first test report to the first computing platform, wherein the sending the first test report to the first computing platform causes the first computing platform to display the first set of test results;

analyze the first test configuration data and the second test configuration data;

based on analyzing the first test configuration data and the second test configuration data, determine that a subset of the first set of test results is to be used during an execution of the second test;

determine that the second test is to be executed;

in response to determining that the second test is to be executed, and based on determining that the subset of the first set of test results is to be used during the execution of the second test, generate a second container based on the second test configuration data and the subset of the first set of test results;

run the second container to generate a second set of test results;

generate a second test report based on the second set of test results; and send the second test report to the second computing platform, wherein the sending the second test report to the second computing platform causes the second computing platform to display the second set of test results.

* * * * *

UNITED STATES PATENT AND TRADEMARK OFFICE
CERTIFICATE OF CORRECTION

| | | |
|---|---|---|
| PATENT NO. | : 11,561,885 B2 | Page 1 of 1 |
| APPLICATION NO. | : 17/171113 | |
| DATED | : January 24, 2023 | |
| INVENTOR(S) | : Varanda | |

It is certified that error appears in the above-identified patent and that said Letters Patent is hereby corrected as shown below:

On the Title Page

Item (72) Inventor:
Delete "Ricardo Jorge Pimental Varanda" and insert --Ricardo Jorge Pimentel Varanda--

Signed and Sealed this
Twenty-ninth Day of October, 2024

*Katherine Kelly Vidal*

Katherine Kelly Vidal
*Director of the United States Patent and Trademark Office*